(12) United States Patent
Sprigg et al.

(10) Patent No.: US 8,699,998 B2
(45) Date of Patent: Apr. 15, 2014

(54) CONTROLLING TEXT MESSAGES ON A MOBILE DEVICE

(75) Inventors: Stephen A. Sprigg, Poway, CA (US); Hugo Swart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/207,119

(22) Filed: Aug. 10, 2011

(65) Prior Publication Data

US 2013/0040604 A1 Feb. 14, 2013

(51) Int. Cl.
*H04M 1/66* (2006.01)
*H04L 12/58* (2006.01)

(52) U.S. Cl.
USPC ........................................ 455/410; 455/412.1

(58) Field of Classification Search
CPC ...... H04L 67/306; H04L 12/585; G06F 21/50
USPC ............... 455/418–419, 466, 412.1–412.2
See application file for complete search history.

(56) References Cited

U.S. PATENT DOCUMENTS

| | | | |
|---|---|---|---|
| 7,330,713 B2 | 2/2008 | Zhu | |
| 8,301,168 B2 * | 10/2012 | Zubas et al. | 455/456.3 |
| 2008/0005325 A1 | 1/2008 | Wynn et al. | |
| 2008/0070609 A1 * | 3/2008 | Ackley | 455/466 |
| 2008/0146259 A1 | 6/2008 | Chin et al. | |
| 2008/0287106 A1 | 11/2008 | Baldwin et al. | |
| 2010/0093308 A1 * | 4/2010 | Cohan | 455/405 |
| 2010/0304766 A1 | 12/2010 | Goyal | |
| 2011/0223944 A1 * | 9/2011 | Gosselin | 455/466 |

FOREIGN PATENT DOCUMENTS

| | | |
|---|---|---|
| GB | 2431072 A | 4/2007 |
| GB | 2456754 A | 7/2009 |
| WO | 2005031544 A2 | 4/2005 |
| WO | 2011086542 A2 | 7/2011 |

OTHER PUBLICATIONS

International Search Report and Written Opinion—PCT/US2012/050429—ISA/EPO—Oct. 30, 2012.

* cited by examiner

*Primary Examiner* — George Eng
*Assistant Examiner* — Nam Huynh
(74) *Attorney, Agent, or Firm* — James T. Hagler

(57) ABSTRACT

Methods, systems and devices for controlling access to messaging (SMS, MMS, email, etc.) on mobile devices (e.g., cell phones) during times or in locations in which such activity is prohibited or inhibited by the parental control settings. Parental control settings limit messaging features available to mobile devices to certain times and/or locations. Messages received at restricted times/locations are stored in temporary memory without notifying the mobile device user (i.e., messages are not placed in the inbox), unless the message is received from a pre-approved source (e.g., parent, teachers, etc.). Once the context for restricting access to messaging (e.g., time, location, etc.) no longer applies, the stored messages may be transferred from the temporary memory to the inbox and the user may be alerted regarding the new message.

32 Claims, 15 Drawing Sheets

CONTROLLING TEXT MESSAGES ON A MOBILE DEVICE

BACKGROUND

Cellular and wireless communication technologies have seen explosive growth over the past several years. This growth has been fueled by better communications hardware, larger networks and more reliable protocols. Wireless service providers are now able to offer their customers an ever-expanding array of features and services, and provide users with unprecedented levels of access to information, resources and communications. Today's cell phones include cameras, GPS receivers, MP3 players, and provide access to web content, data sharing, application downloading, and many other features.

As cell phones and wireless devices continue to grow in popularity, many parents have begun providing cell phones to their young children. Cell phones provide these children with a degree of safety and protection, as they are now able to immediately contact the parents in case of an emergency. However, by carrying a personal cell phone/wireless device, children are now more susceptible to certain dangers (e.g., calls and messages from strangers, access to certain websites) and present more opportunities to access age-inappropriate content and participate in inappropriate or unproductive activities (e.g., texting in class). As more children have access to feature-rich cell phones, parents need better controls over their children's phones.

SUMMARY

The various embodiments provide systems, devices, and methods encompassing an enterprise-based parental control settings server that allows parents to set and control parental control restrictions on their children's cell phones and other mobile computing devices. Various embodiments enable controlling cell-phone access to messaging services during times or in locations in which such activity is prohibited or inhibited by parental control settings. Parents set control settings that limit messaging features available to their children's phones and other mobile computing devices to certain times and/or locations. Messages received at restricted times/locations are stored in temporary memory without notifying the cell phone or other mobile computing device user (i.e., messages are not placed in the inbox), unless the message is received from a pre-approved source (e.g., parent, teachers, etc.). Once the context for restricting access to messaging (e.g., time, location, etc.) no longer applies, the stored messages may be transferred from the temporary memory to the inbox such that the message is accessible to the user.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
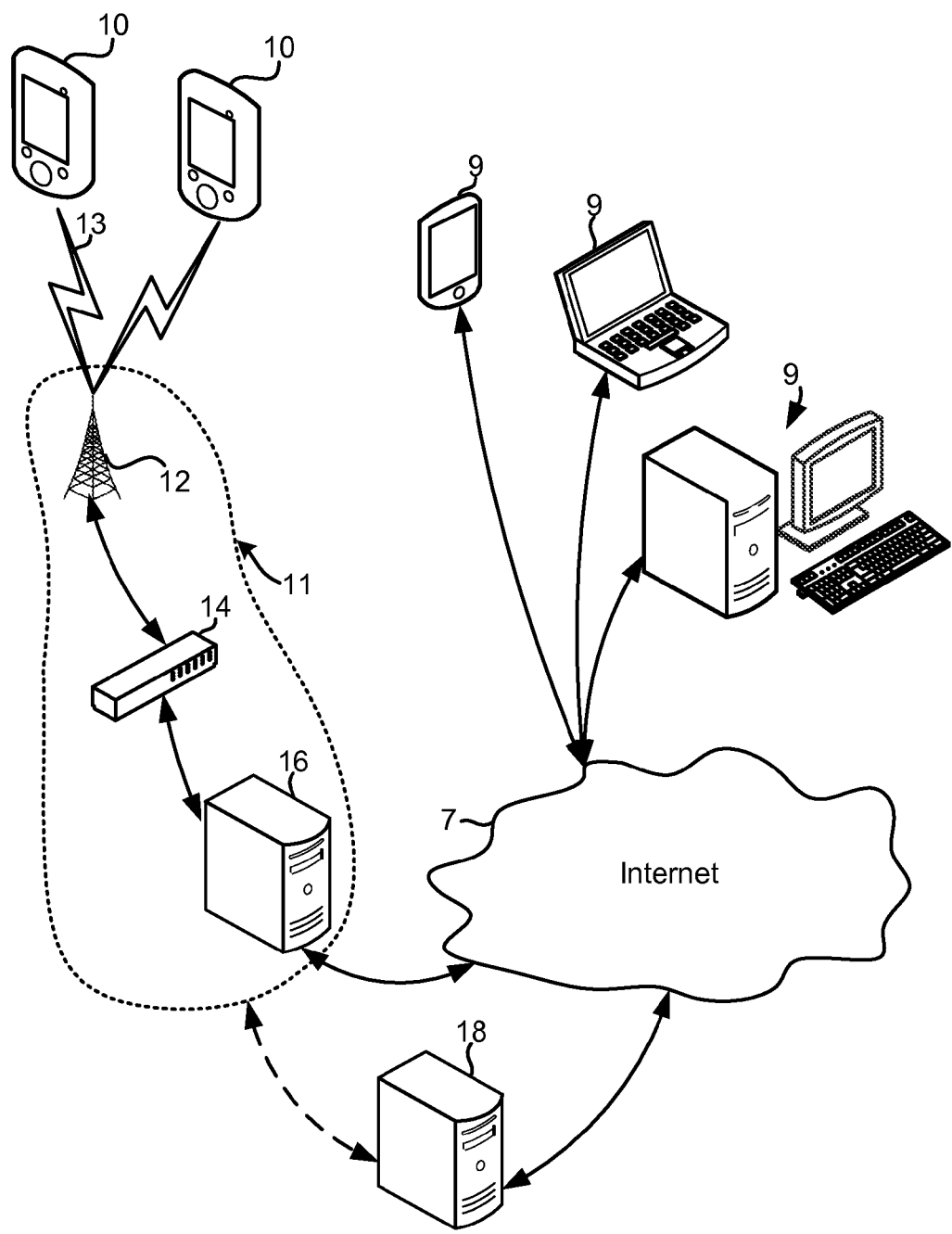
FIGS. 1A and 1B are a communication system block diagrams illustrating network components of two alternative embodiment architectures suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "cell phone," "wireless device" and "mobile device" are used interchangeably herein to refer to any one or all of cellular telephones, smart-phones (e.g., iPhone), web-pads, tablets, Internet enabled cellular telephones, WiFi enabled electronic devices, personal data assistants (PDA's), laptop computers, personal computers, computers sending and receiving short message service (SMS) messages, multimedia message service (MMS) messages, and/or electronic mail (email) and similar electronic devices. However, the terms "cell phone," "wireless device" and "mobile device" should not be limited to the enumerated list of devices.

The various embodiments provide methods, devices and systems for enterprise-based parental controls that allow parents to remotely enable, disable and/or limit the many features and services available on their children's mobile devices, such as cell phones. Modern mobile devices, including cell phones, tablet computers, gaming devices, etc., offer their users an unprecedented degree of connectivity, access, convenience and safety. As mobile devices like cell phones and tablet computing devices continue to grow in popularity, they are quickly becoming an indispensible tool for navigating modern society, interacting with one another, and quickly and efficiently accomplishing many everyday tasks. As a result, many of today's activities (such as those sponsored by schools) are being designed with an expectation that participants have access to the various technologies, features and services provided by modern cell phones and mobile computing devices. For these and other reasons, it is now more common for parents to allow their children to have their own personal cell phones and other mobile devices starting at a very young age and extending throughout adolescence.

Parents take comfort in knowing that their children and teenagers (herein children) may contact them at any time and in cases of emergency. Parents also take comfort in knowing that their children have access to the countless services and resources provided by modern cell phones and mobile computing devices (e.g., tablet computers), and may use these resources for productive activities. Children now use cell phones and mobile computing devices to assist them in completing many of their daily tasks, which may include checking reading assignments, interacting with their teachers, asking questions, updating their activity schedules, participating in pop quizzes, researching class topics, receiving help with homework and many other daily tasks. For these and other reasons, more children have access to cell phones and mobile computing devices than ever before, and many of these children have nearly continuous—and sometimes unfettered—access to the numerous resources and services provided by these mobile devices.

While there are many benefits to allowing children to have access to cell phones and mobile computing devices, it is dangerous to allow children to have unlimited access to many of the services (GPS, text, web, applications, etc.) provided by modern mobile devices. Children who have unrestricted access to such mobile devices are more vulnerable to contact with strangers, and may use the numerous features available on their devices for unproductive or inappropriate activities. While parents desire that their children have some access to certain cell phone and mobile computing device features, parents also need to manage and control the features available on their children's mobile devices. These parents may also desire to extend such restrictions to other media access devices (e.g., televisions, gaming systems, audio and video players, etc.) so their children have consistent access and usage restrictions across all of their media access platforms.

Existing solutions for controlling children's cell phone and mobile computing device usage only allow parents to enable/disable the various device features, and do not provide parents with the ability to control exactly how, when or where each feature is used. Current solutions are not effective because children need the ability to use their cell phone and mobile computing device features for approved activities (e.g., texting their teachers, accessing online databases, etc.). The various embodiments enable children to user their cell phone and mobile computing device features for parent-approved activities while also restricting unapproved and/or unproductive activities (e.g., texting and/or surf the web when they should be paying attention to a lecture or doing homework). The various embodiments provide a centralized parental control settings server that enables parents to finely control how each individual feature is used on their children's cell phones and other mobile computing devices. The parental control settings server may restrict each cell phone feature based on time, location and/or the individual demographics of each child.

The various embodiments provide systems for implementing a comprehensive set of parental controls that allow parents to control their children's cell phones and mobile computing devices in a manner that allows children to use their mobile devices for approved and/or productive activities, and at the same time, restrict them from using their mobile devices for improper and/or unproductive activities. The various embodiments provide a server-based parental control settings server that enables parents to create dynamic and context-specific controls for limiting their children's mobile devices. Context-sensitive controls may be configured to automatically limit mobile device functionality based on time, location, age and/or any definable context. Dynamic controls place adaptive restrictions (which may be context-sensitive) on mobile devices. The embodiments enable parents to create multiple parental control profiles for a single device or a particular child (e.g., providing separate profiles for home, school, night time, etc.). One example of a dynamic control is an age-based control or restriction that progressively enables additional features as the child ages. In an embodiment, such comprehensive restrictions may be applied to all network-enabled media access devices used by their children so usage restrictions can be implemented consistently across all devices. For example, restrictions on times and hours of use may be extended to televisions, gaming terminals and media players through the same system.

A single online interface hosted on the parental control settings server provides parents with a centralized system for managing each individual child's access permissions. This single interface allows parents to control all their children's mobile phones and mobile computing devices quickly and efficiently, without requiring any physical access to the children's devices. Access permissions may be granted, denied and/or limited using a single setting for multiple children based on each child's demographics (e.g., age, sex, etc.), as well as time and location. For example, a parent may use this single interface to set a single context-based setting that allows her thirteen year old son's mobile phone or mobile computing device to access a certain website and/or application (e.g., twitter) during lunch hours, and at the same time, prevents her eight year old daughter's mobile phone or mobile computing device from accessing that same website and/or application while on school property. To achieve this flexibility, parents may define general boundaries for their children (either collectively or each child individually) and allow other approved sources of authority (e.g., teachers, police, the community, volunteer organizations, etc.) to have some control over what/when/how the various cell phone and mobile computing device features are to be used. A parent may set these restrictions through a website interface hosted by the parental control settings server without having to know any of the details of the restricted website and/or application, its age-appropriateness, the school policies regarding its use, or even of the website's existence. The parental control settings server may format an appropriate configuration message that is transmitted (e.g., pushed) to the child's cell phone and/or mobile computing device to cause the cell phone to implement the desired feature restrictions and/or permissions. Thus, the parent also does not need to understand how to program the child's cell phone and mobile computing devices. In a further embodiment, the parental control settings may also be sent to other types of media access devices that have access to a communication network, such as the Internet, a cellular network, a satellite television network, or a cable television network, so those other devices can implement the restrictions in a manner consistent with their children's mobile devices.

As discussed above, various embodiments allow parents to authorize other sources of authority (e.g., teachers, police, community and volunteer organizations, etc.) to have some control over what/when/how the various cell phone features are used. Allowing other trusted sources of authority to have a say in parental control configurations can be beneficial. Many parents find it difficult to anticipate every way their children may use the various services/features available on modern cell phones and mobile computing devices, and require some assistance in distinguishing the appropriate uses from the inappropriate ones. For example, a teacher may request that her students use a cell phone or and mobile computing device during class to text answers to a pop quiz, participate in online polls, or access online resources. That same teacher may discipline students who access unauthorized websites and/or text other students in class. Thus, parents may need to be able to allow their children to use their mobile devices to participate in some encouraged or required activities (e.g., texting answers to a pop quiz), while at the same time restricting them from using the mobile devices for unauthorized or inappropriate activities (e.g., surfing the Internet) without having to actively monitor or manage all appropriate/inappropriate activities available to the child.

As mentioned above, current solutions for controlling cell phone and mobile computing device usage only allow parents to enable/disable the various features. In the above example, parents using current solutions have to disable internet/texting capabilities on their child's phone and mobile computing devices to prevent that child from misusing these features during school. Teachers could contact parents and request certain features be enabled on days they are required for a school activity. In such cases, the parents must remember to enable those features for that day. To further complicate matters, once the features are enabled, parents cannot control exactly how those features are used in other classes, at other times and/or in other locations.

The various embodiments overcome these and other problems with current mobile devices by allowing parents to set general guidelines for their children's mobile device usage and allow other approved sources of authority (e.g., principals, teachers, community, etc.) to automatically control the available features in certain specified conditions (e.g., during school hours and/or on school grounds).

The various embodiments also allow busy parents to defer to or elect rules and/or standards of one or more communities (e.g., school, church, city, organizations, etc.), which are referred to herein as community-based settings, when setting the parental controls for their children's cell phones and mobile computing devices. In an embodiment, the parental control settings server may periodically examine the parental control settings of all or a select group of users to generate community-based configuration settings that reflect the most popular parental control configurations. The server may generate community-based configuration settings based on select communities, such as neighborhoods, cities, counties, states, age-groups, organizations, schools, locations and other groups or social units. Parents may elect one or more of these community-based parental control settings, or define/modify each setting individually. For example, a parent may select a parental control mobile device configuration that is automatically updated to include the most common settings used by parents who live in Oklahoma City and whose children are in the boy scouts. In this manner, busy parents may rely on the collective judgment of others in their selected communities (e.g., boy scouts, Oklahoma City) and trust that their children are restricted from, and have access to, the same features as other children in the selected communities. The parent may modify the community based settings individually, such as to specifically permit or restrict access to a particular website, while leaving the remaining settings the same as the selected community.

The various embodiments also allow each parent to fine tune the settings based on their individual preferences, their circumstances and the maturity of their kids. For example, a parent may wish to discipline a child by disabling the child's mobile device Internet capabilities during school hours even though that child's teacher allows the use of Internet in class. In this example, the parent may access the parental control server to fine tune the parental control settings such that the teacher's settings cannot override the disabling of mobile device's Internet capabilities. Thus, the various embodiments allow parents, teachers and others with the proper permissions to collaborate in controlling the features available on children's mobile devices, with each parent having master control over the features available to each individual child.

Various embodiments may notify the parent (e.g., text, email, etc.) on each occurrence of a parent-definable condition related to the child's activities on the mobile device. For example, the parent may set the parental control settings such that the child's mobile device automatically sends the parent a text message whenever the child attempts to create a new contact, download a new application, make an online purchase, or access a new website. The parental controls may prevent the child from completing such activities until the parent responds to the notification to approve the activity.

As an example of mobile device features that may be controlled, the various embodiments provide systems, devices, and methods for controlling access to messaging (SMS, MMS, email, etc.) on mobile devices (e.g., cell phones) during times or in locations in which such activity is prohibited or inhibited by the parental control settings. As discussed above, parents take comfort in knowing that their children can contact them (or teachers, classmates, police, etc.) at any time and in cases of emergency. For this and other reasons, many children are allowed nearly continuous access to the messaging functions provided by their cell phones and/or mobile computing devices. While allowing children to have continuous access to a cell phone or other mobile computing device has benefits (e.g., the child can text the parent if a stranger breaks in so as to inform the parent and not alert the intruder), it is also has many downsides. For example, the child may receive late night messages from strangers and/or otherwise misuse the device (e.g., texting friends after bedtime). The various embodiments allow some messaging functionality to remain active on the children's cell phones and mobile computing devices while disabling other aspects of the messaging functionality in a manner that allows messages to be received once the restrictions no longer apply. Restricted messages are still received by the cell phone and/or mobile computing device, but are stored in memory and not placed in the inbox when the context (e.g., time of day, day of week, location, etc.) and message sender (e.g., not the parent) are restricted by parental control settings. Once the context for restricting access to messaging no longer applies, the stored messages may be transferred to the messaging inbox and the child may be alerted to the message's receipt.

As discussed above, the embodiments may be implemented with a variety of mobile computing devices. Two types of mobile computing devices for which the embodiments are particularly applicable are cellular telephones (which are also referred to herein as "mobile phones") and tablet computers (e.g., the Apple iPad® and similar products made by other manufactures). Being portable and configured with significant computing capabilities, near-continuous cellular and WiFi network access, numerous applications and intuitive user interfaces, such mobile devices are ideal for providing children access to educational and entertainment resources while enabling them to communicate with their parents at any time. In terms of functionality and operation, the differences between mobile phones and other types of mobile computing devices are diminishing and are expected to become less significant over time. Therefore, in order to simplify the descriptions of the various embodiments, the drawings and the following embodiment descriptions refer only to mobile phones (or cell phones or just phones) instead of referring to all types of applicable devices. Thus, the following references to mobile or cell phones and to cellular telephone networks are not intended to limit the scope of the claims.

The various embodiments may be implemented within a variety of communication systems, such as a cell telephone network, an example of which is illustrated in FIG. 1A. A typical cell telephone network 11 includes a plurality of cell base stations 12 coupled to a network operations center 14, which operates to connect voice calls and data between mobile devices 10 (e.g., cell phones) and other network destinations, such as via telephone land lines (e.g., a POTS network, not shown) and the Internet 7. The mobile devices 10 may each include a deeply embedded parental control settings (ACS) implementing module that allows parental control settings to be enforced on the mobile device and that is resistant to unauthorized modification/tampering. The mobile devices 10 may also support public web and content ratings mechanisms (MPAA, etc.) and may be configured to filter advertisements by category and ratings. Communications between the mobile devices 10 and the network 11 may be accomplished via two-way wireless communication links 13, such as 4G, 3G, CDMA, TDMA, LTE and/or other cell telephone communication technologies. The network 11 may also include one or more servers 16 coupled to or within the network operations center 14 that provide a connection to the Internet 7.

FIG. 1A also illustrates that the communication system may include one or more parental control settings servers 18 connected to the telephone network 11 and to the Internet 7. The connection between the parental control settings server 18 and the telephone network 11 may be through the Internet 7 or through a private network (as illustrated by the dashed arrows), or the parental control settings server 18 may be implemented as a server within the network infrastructure of the telephone network 11. The parental control settings servers 18 may include a parental control enterprise system module and a web-interface accessible to computing devices 9 (e.g., smartphones, laptops, PCs, etc.) via the Internet 7, such as a user interface webpage. The parental control web-interface allows parents to set, update and/or maintain parental control settings on the control servers 18. The parental control settings servers 18 communicate updated parental control settings to the mobile devices 10 via the telephone network 11. The mobile devices 10 use these settings to update, create and/or maintain parental control settings profiles that identify the conditions under which each mobile device 10 feature should be enabled, disabled, restricted and/or otherwise controlled.

Figure 1B:
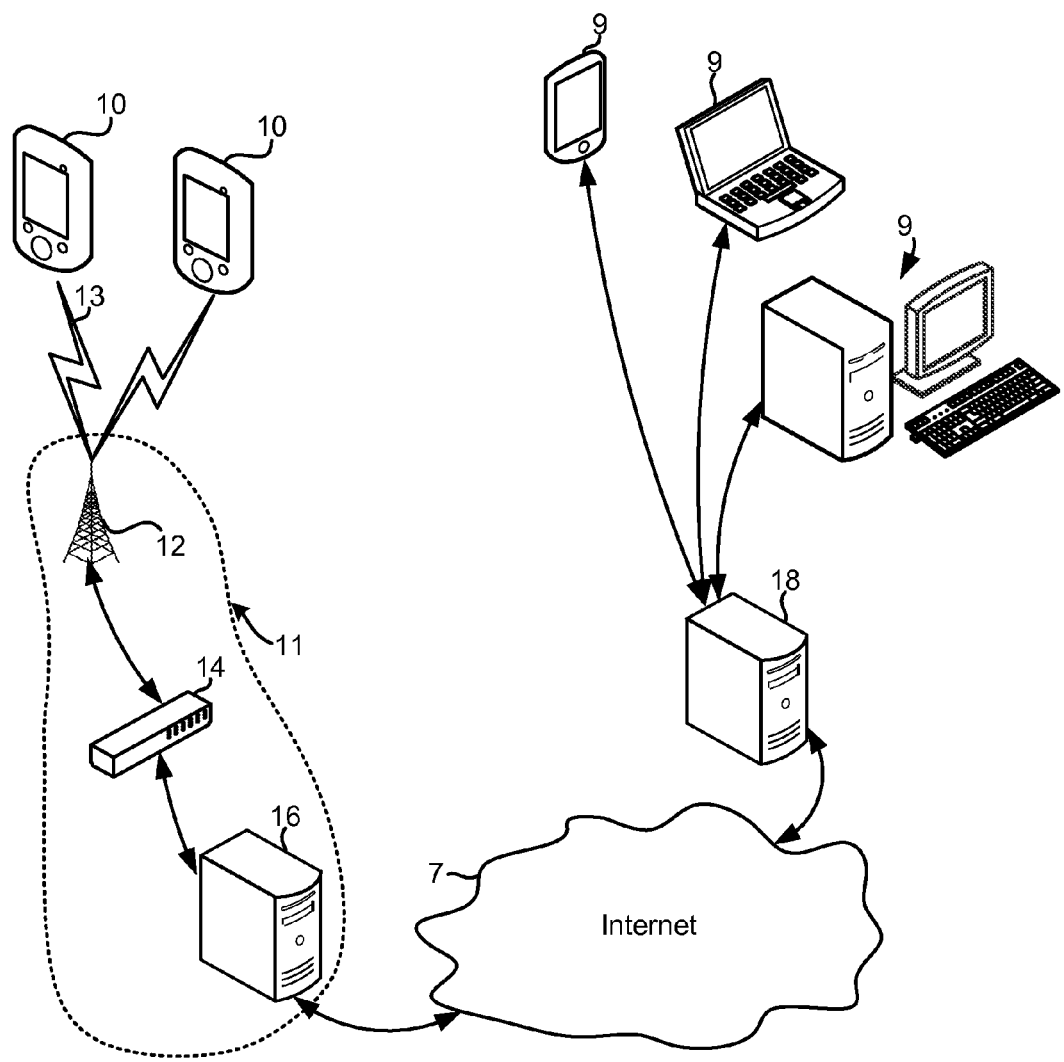

FIG. 1B illustrates an alternative embodiment architecture in which the parental control settings servers 18 are managed by an individual or groups of parents instead of a central server. In this embodiment, each parental control settings server 18 may be under the management and control of a parent or a group of parents who may determine whether the server communicates with other parental control settings servers 18, such as via the Internet. Such a local parental control settings server 18 may be implemented in a computer within the household, such as a server application hosted on the parent's home computer coupled to the network. Alternatively, the local parental control settings server 18 may be implemented in "the cloud," i.e., in one or more servers on the Internet that are under the software control of a parent or group of parents. In this embodiment, the parental control settings functions would not be provided by a central service, but by a server application. Parents may then decide whether to "share" the settings and functionality of their respective local parental control settings servers 18 with others to provide the overview perspective and analysis afforded by the centralized local parental control settings server 18 of the embodiment described above with reference to FIG. 1A.

Figure 2:
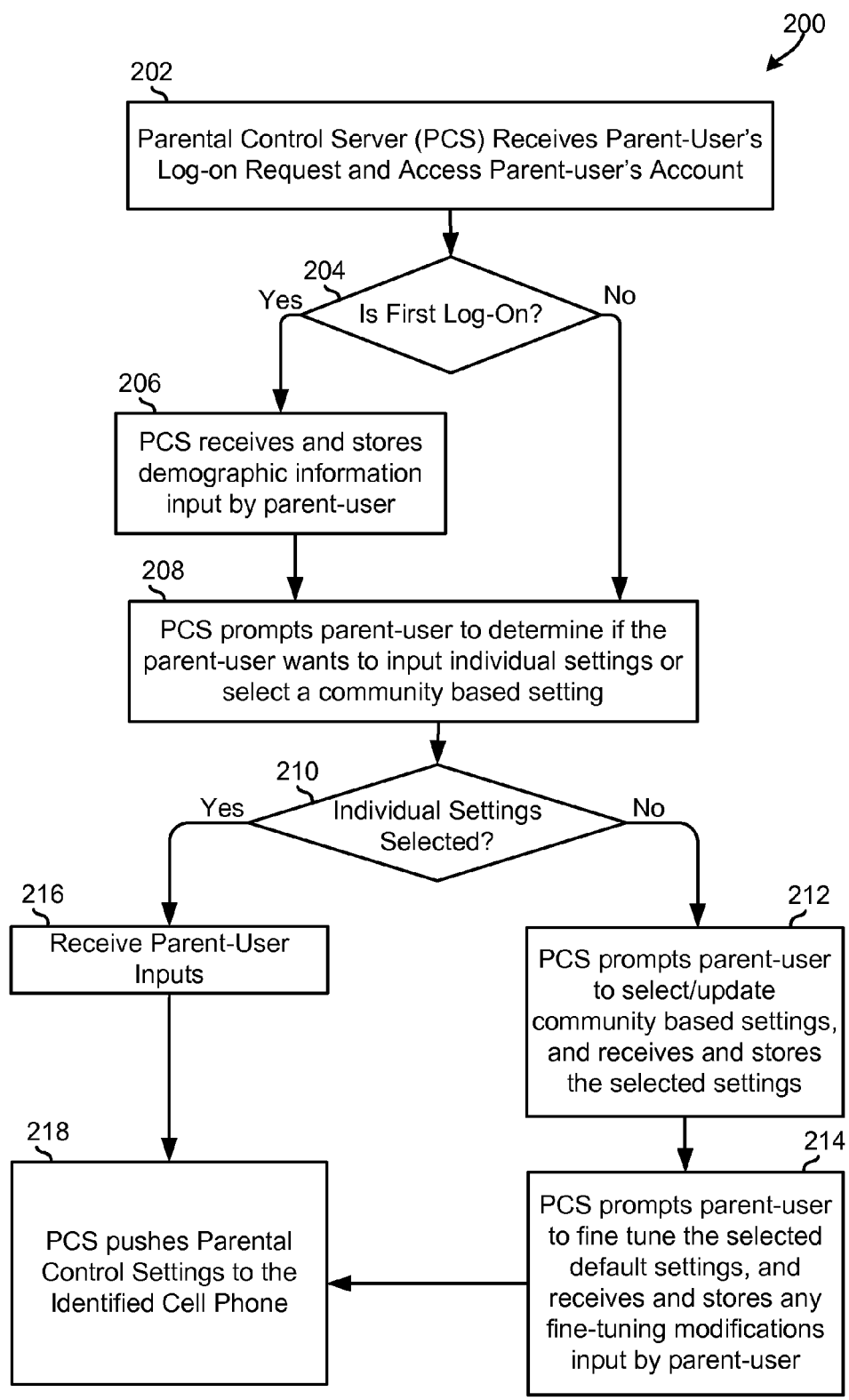
FIG. 2 is a process flow diagram of a method for setting parental controls in accordance with various embodiments.

FIG. 2 illustrates an example method 200 for setting parental controls in accordance with the various embodiments. In step 202, a parent may log onto a parental control website hosted by the parental control settings server enterprise server 18 to access her family account such as by entering account information (e.g., phone number, user ID, password, etc.). As part of step 202, the parental control settings server enterprise server may retrieve information regarding the parent's account. In determination step 204, the server may determine if this is the first time that the parent has logged on to the parental control website. If this is a first time log-in (i.e., determination step 204="Yes"), in step 206, the parental control website may prompt the parent to input optional demographic information about the parent (e.g., number of children, memberships in various organizations, etc.) and/or for each child (e.g., age, sex, schools, activities, classes, etc.).

In step 208, the server may prompt the parent to determine whether she wants to input parental control parameters individually or select a pre-compiled set of parameters (e.g., a community-based setting) for her children/family. In determination step 210, the server may determine if the parent chose to input the settings individually. If the parent chose not to input the settings individually (i.e., determination step 210="No"), in step 212, the server may prompt the parent to select, either for all her children collectively or for each child individually, one or more community-based settings (e.g., pre-compiled set of parameters). For example, the parent may select a community-based setting that grants all her children age-appropriate permissions or may select an age-based setting for her daughter and a time-based setting for her son. The parent may choose the settings from a list and may select from among multiple community-based settings for each child. In step 214, the server may prompt the parent to fine tune the settings to enable, disable or limit each feature for each child based on the parent's individual preferences, circumstances and/or each child's maturity level. The parent may apply the parental control settings to her children collectively (e.g., none of the children may access Facebook®) or each child individually (e.g., son cannot access Facebook® during the day but daughter can). Once the parent is has made her selections, she may submit her inputs/selections (e.g., by pressing a submit button or hitting enter) to the parental control settings server. In step 218, the parental control settings server pushes the restrictions to each child's phone over the telephone network.

Returning to determination step 210, if the server determines that parent wants to input the settings individually (i.e., determination step 210="Yes"), in step 216 the parental control parameters input by the parent may be received by the parental control settings server. These inputs may be received as signals generated in response to the parent clicking on hyperlinked selections (e.g., buttons, check boxes, or setting descriptions), so that the parent can configure parental controls through a series of selections in a menu interface. In step 218, the parental control settings server generates a message suitable for communicating the settings to the corresponding cell phone, and pushes the restrictions message to the child's phone via the cellular telephone network.

Figure 3:
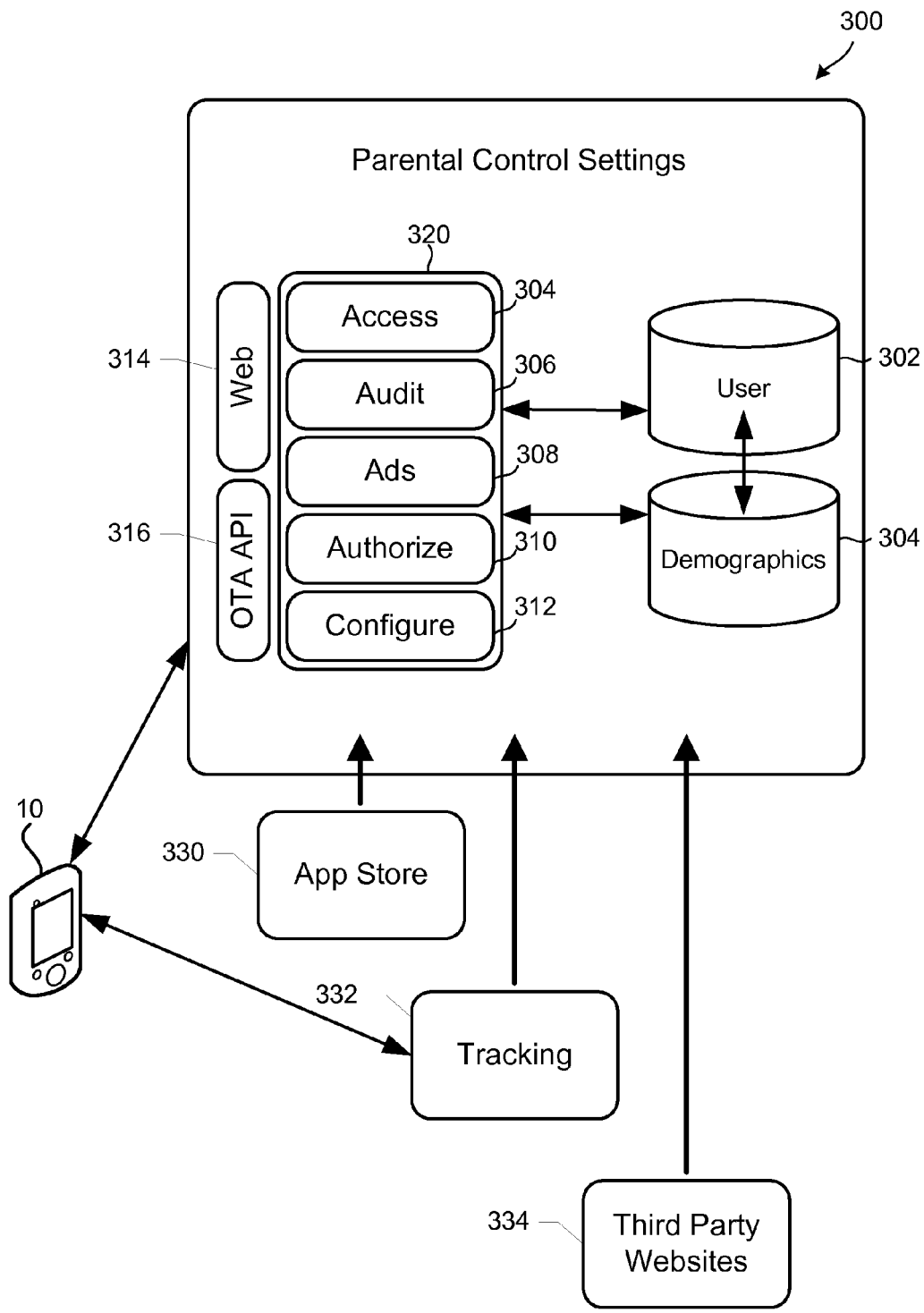
FIG. 3 is component diagram of a parental control settings server module that may be implemented in a parental control server in accordance with various embodiments.

FIG. 3 illustrates a parental control module 300 of a parental control settings server in accordance with the various embodiments. As mentioned above, users may access the parental control settings server via the parental control web-interface from any computer having internet access. The parental control settings server maintains various parameters that may be used to set parental control profiles that identify sets of features and capabilities that are to be enabled, disabled and/or limited on each child's cell phone. The parental control settings server may also manage master accounts (e.g., a family account, parent's account, etc.) through which users can establish and manage the parental control parameters/profiles. Users log onto the parental control settings server to create, modify, select, enable and/or override parental control parameters/profiles maintained by the server. Parental control parameters/profiles may be managed on the parental control settings server such that a child-user cannot circumvent the parameters/profiles without having access to the master account. The parental control parameters may be maintained in a central location (e.g., the parental control settings server) so that the parental control settings may be applied to each child, even as their cell phones are replaced and/or updated, by periodically pushing the parental controls to the controlled phone. The parental control parameters may be context-sensitive. Context-sensitive parental control parameters may be used to monitor a user-definable context condition and enable, disable or limit cellular phone features based on the presence or absence of the context condition. The context condition may be monitored by the controlled phone. In some embodiments, the parental control settings server may also participate in monitoring context conditions.

FIG. 3 also illustrates that the control system module 300 may include one or more centralized databases containing user, demographic and/or restriction information for establishing parental controls on the children's phones, as well as on third party applications and websites. Specifically, the control system module 300 may include a user database 302 and a demographic database 304. The user database 302 may contain information regarding each registered user (e.g., username, family, age, sex, address, etc.). The demographic database 304 may contain demographic information (e.g., age, sex, location) for all members in a manner that enables generation of community based parental control settings without revealing any user's personal information. These databases may be interconnected and each database may cross reference information contained in the other databases.

Each database may also contain a data link to various control parameters 320, which may include parental controls 304, audit controls 306, advertisement controls 308, authorization controls 310, and configurations controls 312. The control parameters 320 may be automatically updated, either periodically or based on one or more triggering events (e.g., change in data, etc.). The control system module 200 may also include embedded software/interfaces for interacting with application-management systems (e.g., an App Store 330) and education based systems or other third party modules or websites 334. In some embodiments, the control system module 300 may further include one or more tracking systems 332 for monitoring the physical location of each phone, the phone's movement history and/or the phone's usage history. The control system module 300 may include an interface for interacting with third party/external tracking systems (e.g., tracking), which may or may not have a component pre-installed on the child's phone.

In an embodiment, the control system module 300 may interact with third party applications and/or websites to inform third party applications and websites of the parental controls. In an embodiment, the parental control profiles may be configured to permit the phone to interact directly with the third party applications/websites and allow third party applications/websites to enforce their own set of parental control settings that are commensurate with the parental control profiles associated with the child's phone. In an embodiment, the third party websites/applications may access the parental control settings server databases (e.g., demographic database 304) directly. In this embodiment, the third party websites/applications may connect to the parental control settings server and check the system's databases for non-personal identification information (e.g., username, phone number, a generated control number, etc.) associated with the user and enforce any relevant restrictions if the user is identified as being subject to the parental control settings server's parental controls.

In one embodiment, the control system module 300 may require all interactions between the child's phone 10 and the third party applications/websites to be funneled through the parental control server, which can filter content transmitted to the child's cell phone based on the parental control settings/profiles.

In another embodiment, third party websites/applications may maintain a separate enterprise database that is populated with data from the parental control settings server. For example, whenever a child uses their cell phone to access a third-party website, the control system module 300 may send one or more parental control setting parameters associated with the child's phone to the third-party website's parental control server, which may store the parental control settings in an enterprise database (herein "third party database") along with the non-personal identification information (e.g., username, phone number, a generated control number, etc.) for the child user/child phone. This communication of parental control settings from the parental control settings server may be accomplished in response to a request for such information from the third-party website, or in response to the child's cell phone informing the parental control settings server of the attempt to access the third-party website. The third-party website may access the third party database each time the child user accesses that website and cross-check the identification information (user name, login, control number, etc.) to the parental control settings in the third-party database. In this manner, parental controls established on the control system module 300 may also follow each child, even when the child borrows a phone from another child or accesses the Internet from a new computer, subject to ordinary user identification and authorization methods. The various embodiments may employ the use of control numbers as identification information, allowing the parental control settings server to provide third-party websites with applicable parental control setting without disclosing personal information (e.g., child's name) that the parent may not wish to share.

The parental control settings server 300 may include a world wide web (Web) module 314 for sending and receiving information over the Internet and an over-the-air application programming interface (OTA API) 316 module for transmitting information over the air via a wireless cellular network. In an embodiment, the Web 314 and OTA API 316 modules may be used to control access to third party websites/applications. As mentioned above, the control system module 200 may require all interactions between the child's phone 10 and the third party applications/websites to be funneled through the parental control server, which may filter content based on the parental control settings/profiles.

Figure 4:
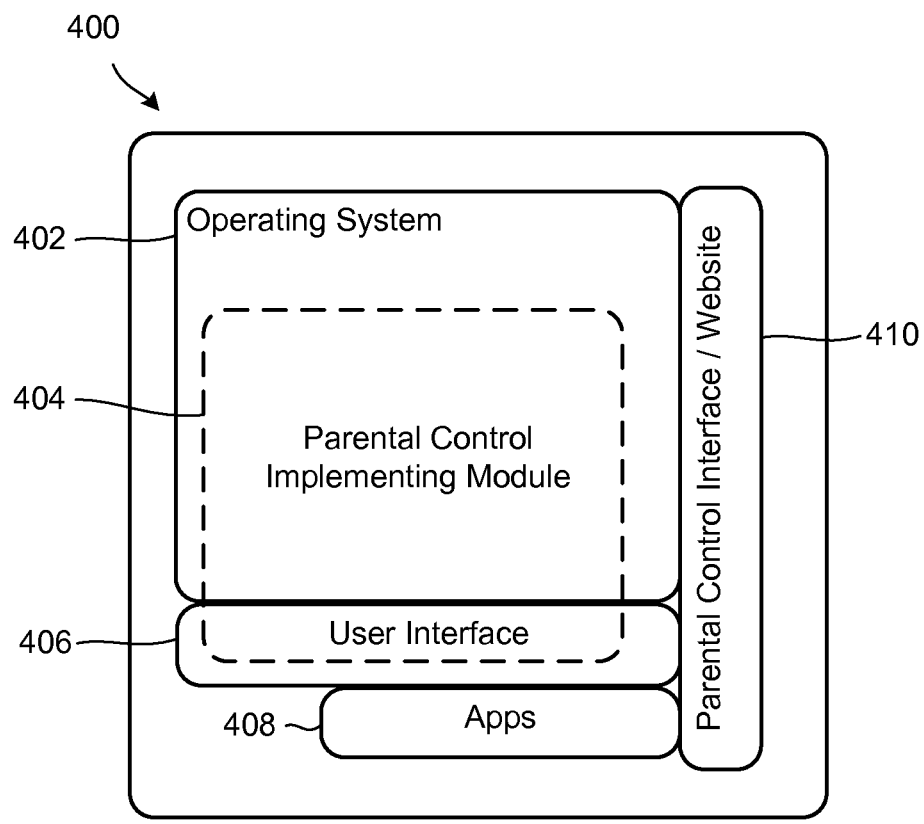
FIG. 4 is a component diagram illustrating functional components that may be implemented within a receiver device suitable for implementing various embodiments.

FIG. 4 illustrates functional components that may be implemented within a receiver device (e.g., a child's phone)

in the various embodiments. Software modules of a receiver device may be organized in a software architecture 400 similar to that illustrated in FIG. 4. The software architecture 400 may include a parental control profile implementing module 404 embedded inside the operating system 402. The parental control profile implementing module 404 may also be implemented in a software layer between the application layer and the operating system layer. The parental control profile implementing module 404 may also be implemented within or encompass a portion of the user interface 406. The parental control profile implementing module 404 may be configured to enable, disable, or restrict each of the various features available on the phone based on the parental control profile settings received from the parental control settings server. Some examples of the mobile phone functions and features which may be restricted on receiver device include: use of hardware components (e.g., camera, GPS receiver, WiFi transceiver, etc.), normal telephone (i.e., voice calls), simple messing service (SMS) messaging and multimedia messaging service (MMS) messaging. The parental control profile implementing module 404 may also manage/update the parental control profiles by receiving updated parental control parameters from the parental control server and using the updated parameter to update parental control profiles on the receiver device. A parental control interface 410 may prevent a request for access to content (e.g., on the web, music, advertisements, apps, MP3 player, etc.) from being accepted and/or processed by the operating system 402. In this manner, blocked functions or content may not be presented to the user through the user interface 406 or used by one or more applications 408 on the device based on the parental control profiles.

Figure 5A:
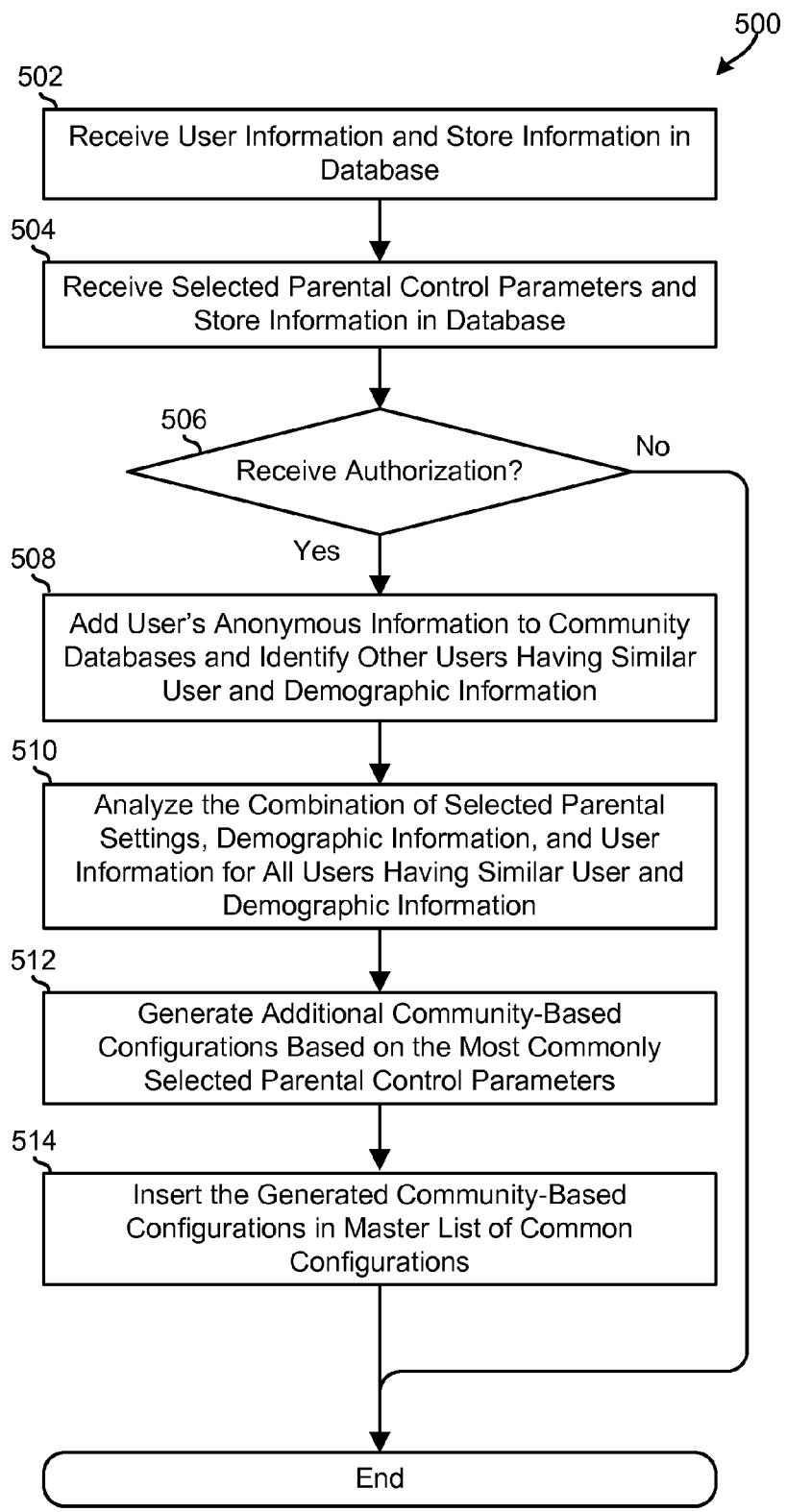
FIGS. 5A and B are a process flow diagrams of two embodiment methods of automatically generating new general community-based configurations based on common configurations.

FIG. 5A illustrates a method 500 for analyzing the information in databases to automatically create community-based configurations selectable by other users of the parental control settings server. Community-based configurations may be generated based on any definable parameter accessible to the system, such as child's age and sex, location, community affiliations, school, etc. The parental control settings server may maintain a database of parental control profiles for each child registered with the system and may be informed of the child's demographics and residence. The parental control settings server may use the parental control settings of multiple users to develop an averaged or community-based standard or set of parental controls and make such configuration available to other parents/users. In an embodiment, the parental control settings server may establish community based set of controls by analyzing the parental control parameter sets across an aggregated pool of accounts in a particular community. For example, a parent configuring a parental control profile for a ten year-old child could merely select an age/gender based profile and allow the system to apply the restrictions and context criteria of the selected community-based settings for the child's age and gender. The parent may also further customize individual parameters according to their preferences without having to specify every parameter in the control settings. For example, if the community-based parameter for text messages inhibits messaging between 9:00 PM and 7:00 AM, a parent may customize this restriction to expand or reduce these restrictions.

Returning to FIG. 5A, in step 502 of method 500, the parental control settings server may populate the user and demographic databases by receiving user settings and demographic information (e.g., child's age, sex, school, etc.). In step 504, the server may receive the selected parental control parameters and store the information in a database. In an embodiment, as part of step 504, the parental control settings server may prompt the user to select one or more general community-based configurations and to fine tune the selected community-based configurations by modifying the parental control parameters and receive, in the parental control server, a set of parental control parameters associated with the user's selections and modifications. In determination step 506, the parental control settings server may prompt the user to indicate whether the user authorizes the use of that user's non-personal information (e.g., user information, demographic information, parental control settings, etc.) to generate community-based configurations selectable by other users. If the parental control settings server receives authorization to use the non-personal information (i.e., determination step 506="Yes"), in step 508 the parental control settings server may strip out all personal/identifying information, add the user's anonymous information to a community database and identify other users having similar user and demographic information. In step 510, the parental control settings server may analyze all parental control settings of members authorizing such user of their information to identify the most popular settings by age, sex, and other parameters. This analysis may employ any of a variety of known statistical analysis techniques, including for example, averaging, determining a standard deviation of the distribution of settings in the sample, and determining settings selected by a majority or super majority in the sample. In step 512, the parental control server may generate one or more community-based parental control setting configurations based on the most common settings, such as by age, sex, etc. In step 514, the parental control settings server may insert the generated community-based configurations in a master list of common configuration settings to be included with the other community-based parental control configurations (i.e., eight-year-old girl in Oklahoma City).

Figure 5B:
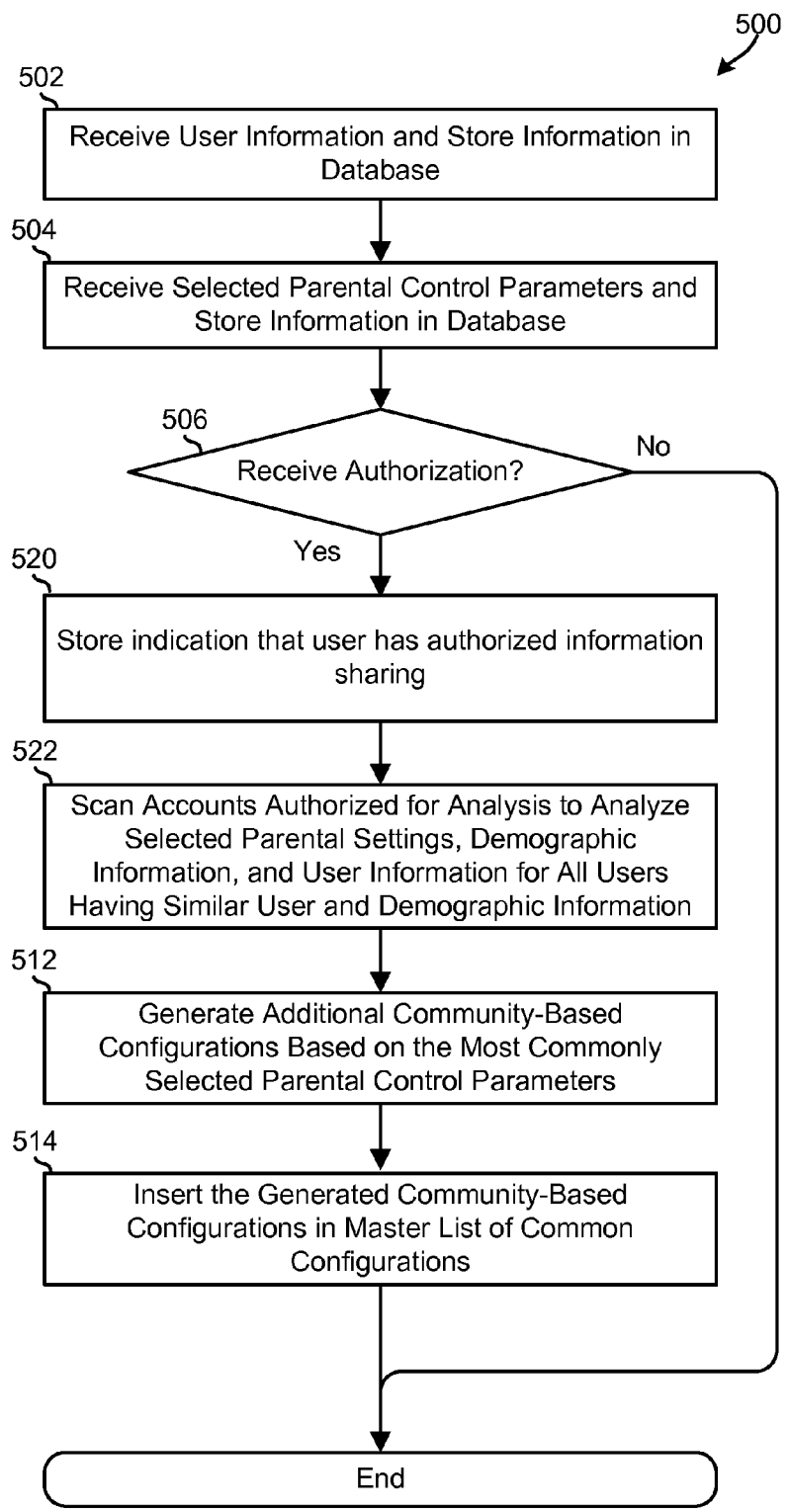

In another embodiment illustrated in FIG. 5B, the parental control server may simply scan the accounts that parents have authorized for sharing to generate the community based standards. For example, the method may include the same or similar operations as described above with respect to FIG. 5A for like numbered steps with the exception that in step 520 the parental control server may store an indication (e.g., a flag) with each user record entry regarding whether the user has authorized information sharing. When the parental control server analyzes account data to develop community based standard, in step 522 it may scan those accounts indicated for sharing and analyze the settings, user and child demographics and user information to generate community based configurations in step 512.

In an embodiment, the parental control server may periodically re-analyze the parental control settings in a community, or analyze the most common modifications to the community-based configurations and update the community-based settings accordingly. In this manner, the parental control server may generate "evolving settings" that change over time, enabling the parental control settings server to continuously fine tune the community-based system configurations to more accurately meet the preferences of users. In an embodiment, the parental control server may present parents with the option to either always retain the parameters of the originally selected configuration (i.e., exactly as they were when the parent set up the account) by opting out of the "evolving setting" configurations, or choose to have the parental control settings on their children's cell phone updated automatically as the elected community-based settings are updated (e.g., opt in to the evolving settings).

In an embodiment, the parental control settings server may create various user-categories based on information provided by users (e.g., income, occupation, organizational memberships of parents/children, city of residence) and create various demographic groups (e.g., single parents living in Oklahoma City with incomes above $80,000/year) of users having similar information. The parental control settings server may analyze each user's information in view of their associated demographic groups and child demographics to generate new community-based configurations and/or templates based on the most common settings selected by members of those demographic groups. For example, the parental control settings server may create a new general community-based configuration based on the selections of parents who live in a particular city (e.g., Oklahoma City) and/or are associated with a particular organization (e.g., have at least one child in the Boy Scouts). In this manner, other parents may select a community-based general setting that affords their children the same privileges and restrictions as other children of parents with similar backgrounds, interests, and/or activities.

In various embodiments, communities may establish sponsored profiles that may be authorized or endorsed by a variety of organizations, such as religious bodies, the Boy Scouts and Girl Scouts of America, a local school district, a political party, etc. In this manner, parents may select a parental control profile they believe will be in sync with their values and beliefs, or with the child's specific interests. As mentioned above, community-based settings may be recalculated periodically in order to keep pace with changing standards of the selected community. Community based settings may also automatically adjust as the child ages, with the parental control profile remaining consistent with restrictions imposed by the selected community for children of various ages. For example, if a parent configures a ten-year-old child's mobile phone by applying the parameters for ten-year-olds in a community, after one year the device may automatically update the child's parental control profile by applying the community-based parameters for eleven-year-olds in that community (which presumably contain slightly less restriction).

As mentioned above, the parental control settings server may host a website providing a user interface for creating, updating and/or otherwise configuring more than one parental control profile. Each parental control profile may identify a set of parental control parameters/restrictions that are to be applied to the child's phone. The parental control settings server may enable parents to create multiple parental control profiles for each child. For example, a parent may establish a "Normal Profile" identifying what the child can do under normal circumstances, and a "Restricted Profile" identifying what the child can do when he/she is on restriction (e.g., "grounded"). Parental control profiles may be dynamic and/or context-sensitive. For example, the parental control profiles may include dynamic restrictions that vary for each individual feature (e.g., by time of day, day of week, date, location, etc.) and context-sensitive restrictions that are only activated in a defined context such as to limit certain individuals from calling/messaging after 9 PM, or turn off the camera in school, etc. In an embodiment, the restrictions may be configured to limit all calling/messaging except for contacting certain individuals/entities, such as the parent, 911, and authorized contacts (e.g., those people known to, and authorized by, the parents).

The user interface may also include an option for authorizing third party parameters and/or restrictions to be layered on top of the parent's selected settings. For example, the parental control settings server may prompt a parent-user to identify one or more trusted authorities (e.g., teachers, principals, etc.) that are authorized to temporarily modify the parent-user's selected parental control settings. The parental control settings server may maintain an account for each trusted authority, allowing the trusted authority to create parental control parameters and/or restrictions that are pushed to the child's phone to override parental control parameters defined by a parent-user under certain specified conditions (e.g., time and day of week, phone location, etc.). For example, a parent may restrict the controlled phone's capabilities such that when the child is in school (or in a particular class in that school), only the features indicated as allowable by both the parent and a teacher for that location (e.g., accessing the Internet in history class) or for that time (i.e., text messaging from 11:00 AM to 11:50 AM) are enabled. In this manner, a child's cell phone may be configured to automatically enable certain features (e.g., sending/receiving texts), without requiring the parent to know any of the details of the school's cell phone usage policies. The parental control settings server enables the parent to simply select a trusted authority (e.g., school) to overlay the authority's parameters on top of the parents' parameters such that the child's cell phone is restricted to uses that are in accordance with the rules and policies of both the parent and the authority.

Figure 6A:
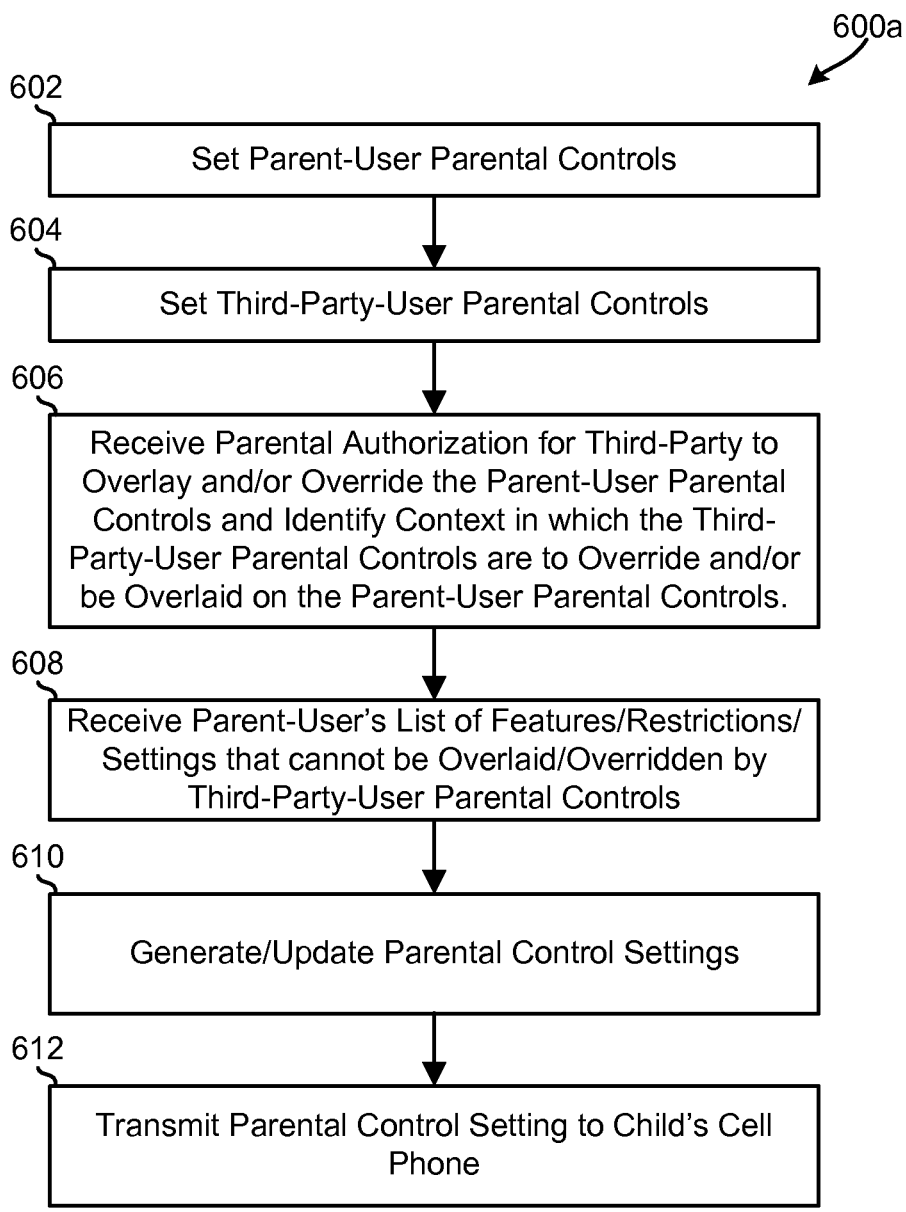
FIGS. 6A-6D are process flow diagrams of embodiment methods for allowing third party parental controls to overlay master parental controls in accordance with various embodiments.

FIG. 6A illustrates an embodiment method 600a that may be implemented in the parental control server for allowing third party parental controls to overlay master parental controls. In step 602, a parent-user logs on to the parental control settings server and sets the parental controls (e.g., selects a configuration and fine tunes the configuration). In step 604, a third party may log onto their own account (maintained by the parental control settings server) and set parental control settings enabling, disabling, and/or restricting various cell phone features/uses under defined conditions (e.g., time, day of week, location, etc). In step 606, the parent may log on to the parental control settings server and authorize one or more third parties to apply the third party parental control profiles or third party parental control parameters to a child's mobile phone. In step 606, the parent may also specify the authorized contexts, (e.g., based on time, location, etc.) in which the third party controls may override and/or overlay each of the cell phone features. In step 608, the parental control settings server may receive a list of the features, restriction and/or parental control settings that the parent does not want modified by the third party controls. In step 610, the parental control settings server may generate or update parental control settings. In step 612, the parental control settings server transmits the generated/updated parental control settings to the child's cell phone.

The child's cell phone may check to determine if the context identified by the parent applies (e.g., phone is in identified location, time of day, day of week, etc.) to the child. If the specified context authorized by the parent does not apply, the phone is not restricted by the third party control settings and only the parent's parental controls are applied to the phone. However, if the specified context authorized by the parent does apply, the third party's parental control profile may override and/or overlay the parental control profile configured by the child's parent. For example, a teacher who wishes all her students be able to submit questions via text message during the class may configure a parental control profile blocking all outgoing text messages except for those sent to the teacher's own device (as well as the parent if so set by the parent). The teacher may establish a third party parental control profile that specifies the context in which the teacher's settings are to be applied, such as the time or location of the class and/or other demographic information (e.g., the school, grades, etc.) A parent who has enabled/disabled text messaging features on her child's phone may authorize an override of the parent's control profile on a child's device by any authorized individual (e.g., the child's teacher) or organization (e.g., school, church, etc.) and tie this authorization to a variety of context settings, such as time of day (i.e., during school hours) or location (GPS coordinates of the school or classroom). In this manner, when the phone is within a context authorized by both the parent and the authorized individual (e.g., the child is in school) both the third party parameters and the parent's parameters may be applied to the phone (e.g., outgoing text messages to the teacher are enabled and all other outgoing text messaging is disabled).

Figure 6B:
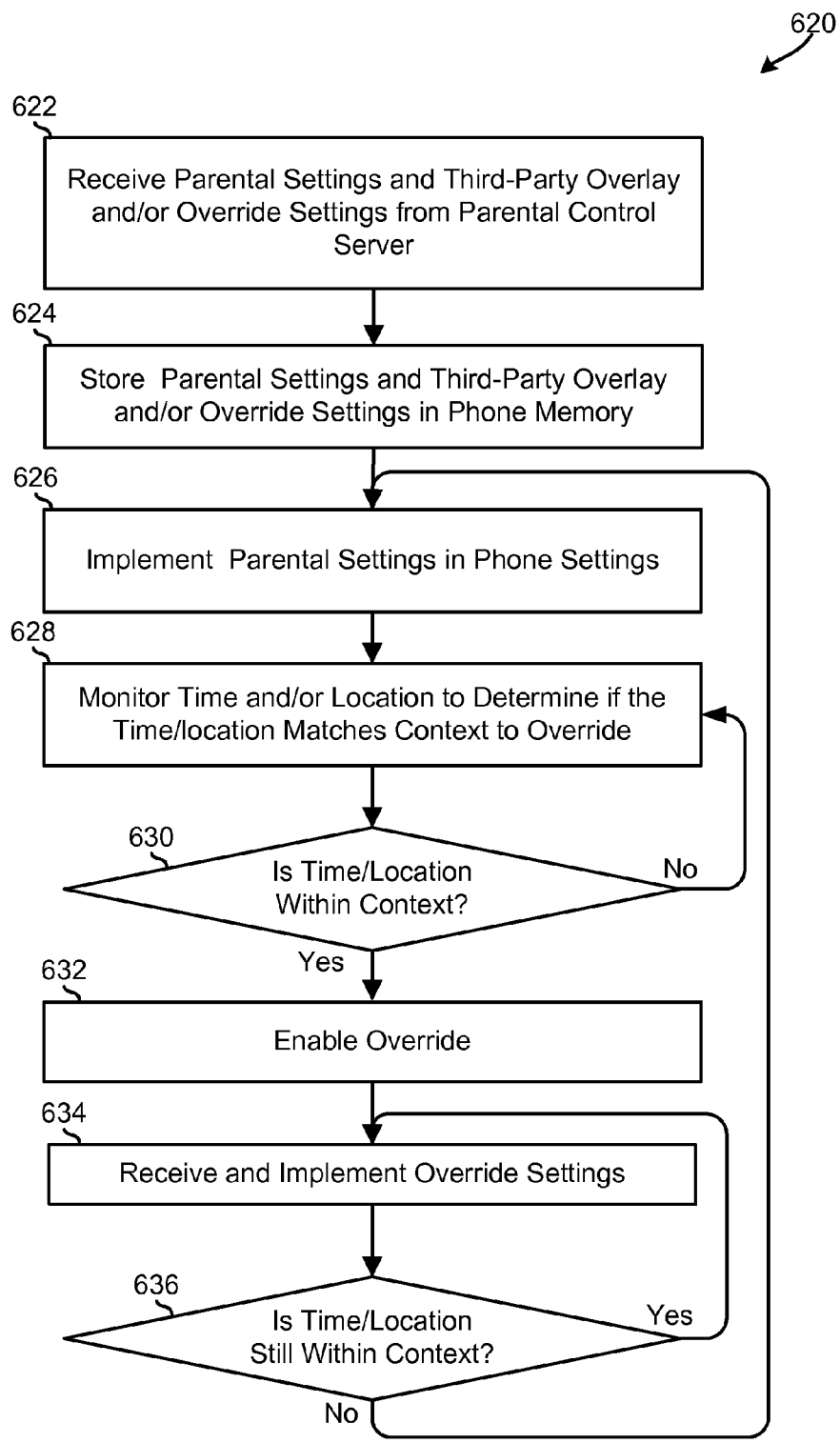

With the parental control settings and override settings pushed down to the child's phone, implementation of those settings may be accomplished by the phone's processor. An embodiment method 620a for implementing such settings in the phone's setting is illustrated in FIG. 6B. In method 620a in step 622, the child's phone may receive the parental control settings and the third-party overlay and/or override settings from the parental control server. In step 624, the processor may store the received settings in the phone memory. In step 626, the processor may implement the received parental control settings by changing the phone settings accordingly. In step 628, as part of normal operations, the processor may monitor the current time and/or geographic location to determine whether those parameters match the context specified for the override configuration. In determination step 630, the processor may determine whether the override context be satisfied. If not (i.e., determination step 630="No"), the processor may continue to monitor the time and location while continuing to implement the parental control settings. Once the time and/or location matches a context specified for the override configuration (i.e., determination step 630="Yes"), the processor may enable override by the designated authority in step 632. This may involve changing phone settings and listening for new configuration settings received from an authorized authority, such as may be identified in the third-party overlay settings received in step 622 and stored in memory in step 624. When override control settings are received they may be implemented in step 634. In determination step 636, the processor may then monitor the current time and/or location to determine whether the context for the override configuration remains satisfied. So long as the override context remains satisfied (i.e., determination step 636="Yes"), the processor may continue to implement override settings received from an authorized authority. Once the override context is no longer satisfied (i.e., determination step 636="No"), the phone processor may return to step 626 to implement the parental control settings on the phone.

Figure 6C:
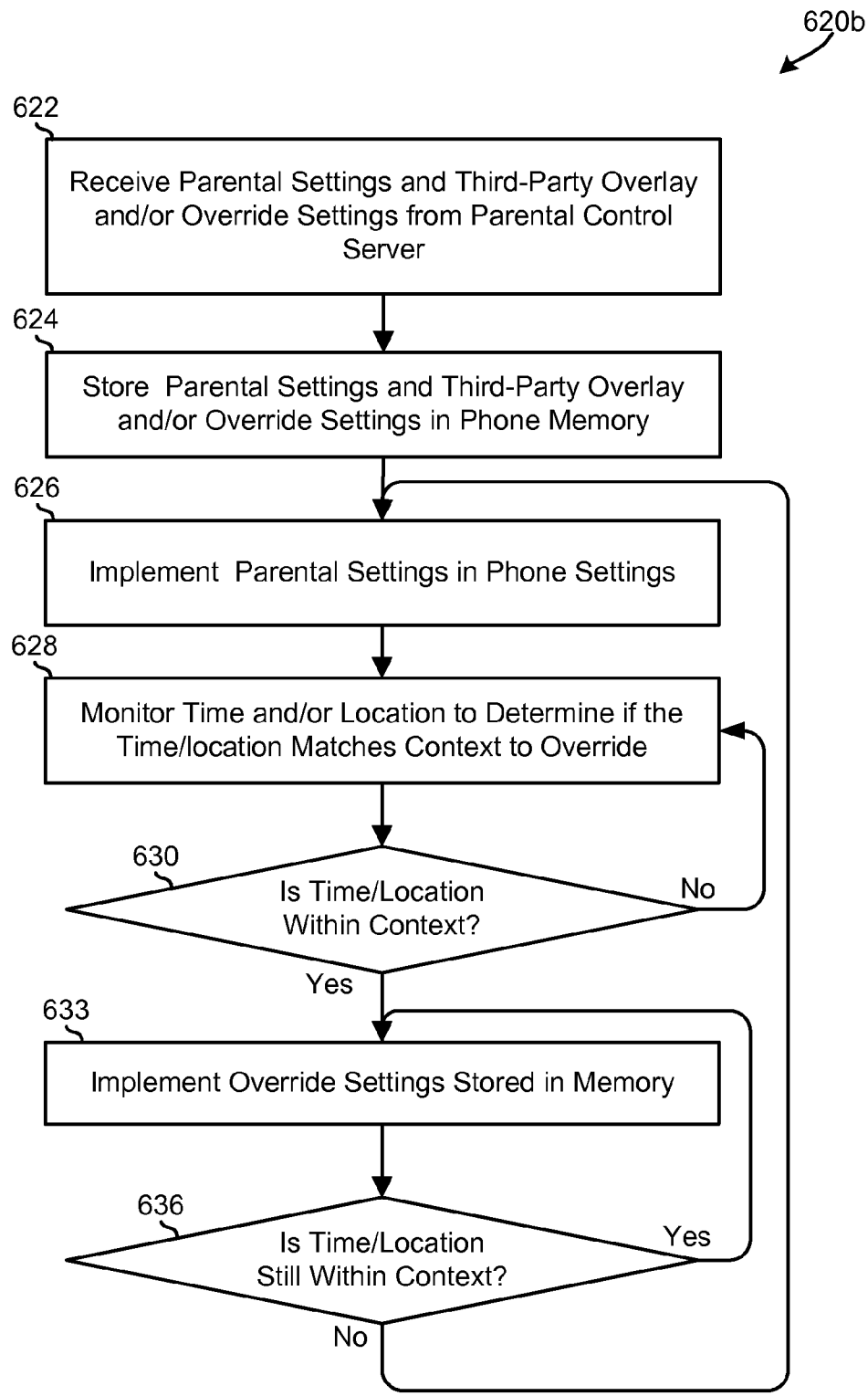

FIG. 6C illustrates another embodiment method 620b for implementing override controls within authorize context. This embodiment method is similar to that described above with reference to FIG. 6B with the exception that the override controls are downloaded directly from the parental control server in step 622. In this embodiment, an authorized authority requesting parents permission to change their parental control settings in certain defined circumstances specify to the parents or the parental control server the override settings they would like to implement. These override settings are then pushed to the child's phone along with the parents parental control settings. In step 624, the parental control settings and the override settings are stored in memory. When the phone processor determines that the current time and/or will location of the phone satisfies the context for the override settings, in step 633 the phone processor implements the override settings that were stored in memory in step 624. The processor then continues to monitor the current time and/or location to detect when the override context is no longer satisfied in determination step 636. Once the override context is no longer satisfied (i.e., determination step 636="no"), the phone processor returns to said 626 to implement the parental control settings as described above. This embodiment requires storing both the parental control settings and the override settings in the phone memory. However, current and future cellular phones have more than enough memory to store both sets of settings. This embodiment reduces the amount of data that must be transmitted over the air and also defeats any effort to avoid receiving changes in control settings such as by entering a place of poor cellular reception or turning off the device when a control setting transmission is anticipated.

Figure 6D:
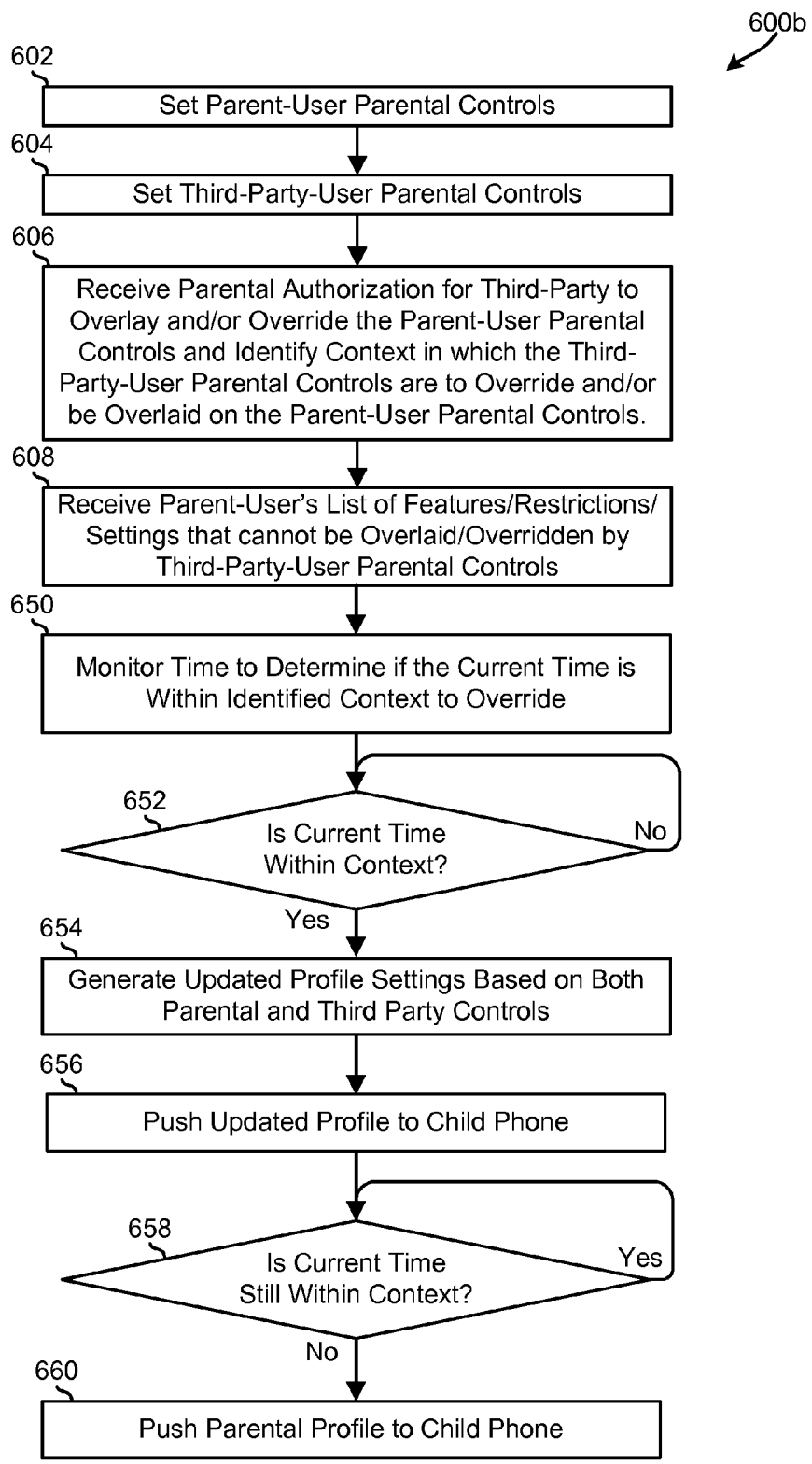

FIG. 6D illustrates another embodiment method 600b which enables third party parental controls to overlay master parental controls by transmitting new parental control settings to the phone. Steps 602-608 are the same as that of method 600a discussed above with reference to FIG. 6A. However, in step 650 of method 600b, the parental control settings server may monitor the time to determine if the current time is defined as an identified context in which the third party controls are to be applied to the child's phone. In determination step 652, the parental control settings server may determine if the current time is within identified context. If the current time is within the identified context (i.e., determination step 652="Yes"), the parental settings control server may, in step 654, generate an updated profile setting that includes the parental control parameters defined by both the parent and the third party. In step 656, the server may push the generated profile setting parameters to the child's phone. In determination step 658, the parental control settings server may check to determine if the current time is still within the identified context. If not (i.e., determination step 658="No"), the parental control settings server may push the normal parental settings to the phone in step 660 so that the third party parameters will no longer control the child's phone.

The various embodiments enabling override controls by authorized individuals may also be implemented to enable children's phones to be used as extensions of a teacher's electronic equipment. For example, the same mechanism used to transmit override settings could also be used to transmit media control commands, such as to display different menus or content on the device displays. In this manner, the embodiments may enable the electronic classroom in which each child's phone becomes an extension of the teacher's computer or display equipment. For example, when leaving a classroom through a lesson, a teacher may use a personal computer to send messages via the cellular network that causes the text or graphics content displayed on each phone to shift to the next page. In this manner, student phones may be used to guide children through a lesson without relying on the children to follow instructions for turning a page, selecting a different media file or otherwise following instructions on their phone interfaces.

Restrictions on use in school based on time periods and geographic boundaries is just one example of a context-sensitive controls that automatically limit cell phone functionality based on any definable context (e.g., time, location, academic performance, etc.). The parental control server may generate many different types of context condition profiles (e.g., child is in school, child has maintained a B average, etc.) based on the context-sensitive control settings specified by the parent. The parental control server may interact with one or more external databases containing information relevant to a controlled phone/user and automatically determine if the context condition has been met. For example, in an embodiment, the parental control server may connect to a school's grade notification system to obtain the child's current grades, and then automatically select a parental control profile based on the child's grades. In this example, the parental control server may push out a first profile with less restrictive parameters when the child's grade point average exceeds one threshold and a second profile with more restrictive settings when the child's grade point average falls below a certain threshold. Similarly, the parental control server may maintain punishment or restrictive parental control settings profiles (e.g., a "grounded" profile) which might block all outgoing and incoming phone calls or text messages, except for calls/ messages from/to parents or "911," for example. The parental control settings server may be configured to automatically push out to the cell phone a punishment profile (e.g., "grounded" profile) based on context conditions (e.g., child has below a B average, etc.). The punishment profile may be configured by the parent to expire after a fixed period of time (i.e., the time the child is grounded), after which the server pushes out a normal parental control profile to the controlled cell phone. In an embodiment, the expiration date for each profile restriction may be set individually by the parent through the parental control website interface and the parental control settings server may automatically push out to the cell phone less restrictive parameters as time passes. In this manner, parents can set the restrictions settings such that the child's continued good behavior is rewarded by slowly enabling more cell phone features and/or tying the enablement of features to the child's performance (e.g., maintained a certain grade point average).

As an example of feature restrictions that may be implemented in an embodiment, the parental controls may be used to control a cell phone's messaging (SMS, MMS, email, etc.) capabilities during times and/or in locations where such activity is prohibited or discouraged. For example, parents, teachers, or any authority with the proper privileges may restrict a child from text messaging while in class, after a designated bed time, or in movie theaters (as may be determined by comparing GPS coordinates to locations of theaters). As discussed above, such restrictions on messaging may be combined so that during restricted times text messages are received by the phone but not made accessible to the child. For example, a parent may disable her child's phone's texting capabilities during school hours such that all texts received while the child is physically on school property (or during school hours) are stored in a temporary memory inaccessible to the child. When the child's phone leaves school property after the school day ends, the text messages are moved from the temporary memory to the child's inbox such that they are accessible to the child. The storing of messages in a temporary memory is important because many such messages are transient and cannot be retrieved if they are not delivered. By storing these messages in a temporary memory inaccessible to the child, the parental control settings server preserves the messaging functionality while limiting its use to the identified context conditions.

Figure 7:
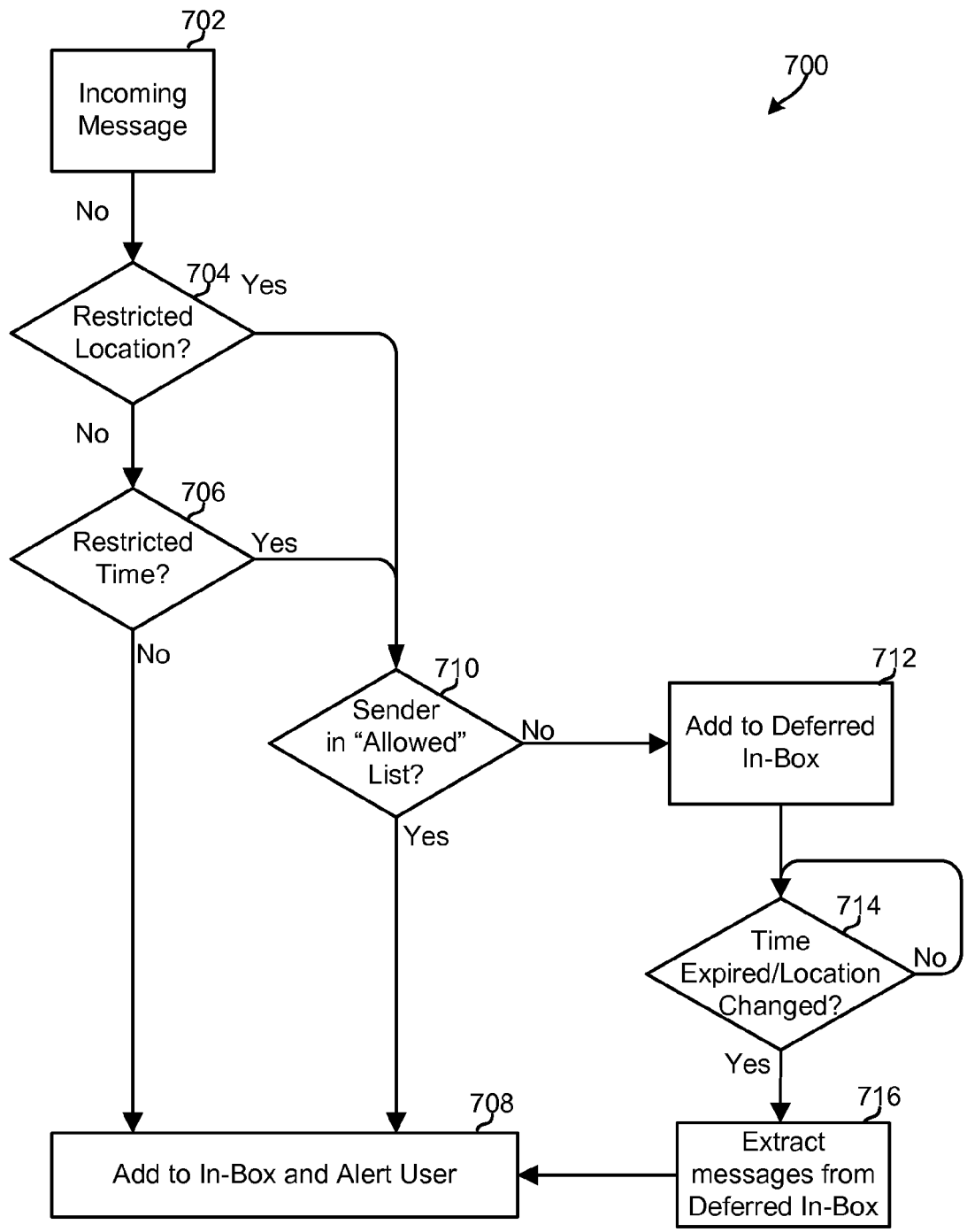
FIG. 7 is a process flow diagram illustrating an embodiment deferred delivery method for controlling a cell phone's capabilities.

FIG. 7 illustrates an embodiment deferred delivery method 700 for controlling a cell phone's messaging capabilities (e.g., SMS, MMS, email, etc.) during times and/or in locations where such activity is prohibited or discouraged. In step 702, an incoming message is received at a child's mobile phone. Prior to outputting any alert that the message was received, the mobile phone processor checks the parental control restriction conditions to determine if the message should be made available to the cell phone. For example, in determination step 704 the parental control settings server may check the location of the cell phone to determine if it is in a restricted location. If the phone is not in a restricted location (i.e., determination step 704="No"), in determination step 706, the phone may compare the current time to time restrictions to determine if messages are currently restricted during this time. If the incoming message is not restricted at the current time (i.e., determination step 706="No"), in step 708 the processor may add the incoming message to the inbox and output an alert, notifying the user that a new message is available.

If either of the location or time restriction conditions are not met (i.e., determination step 704="Yes" or determination step 706="Yes"), in determination step 710 the processor may determine if the message sender is listed in an "allowed sender" list. If the sender is allowed (i.e., determination step 710="Yes"), in step 708, the parental control settings server may add the incoming message to the inbox and output an alert to notify the user that a new message is available. If, however, the sender is not in the allowed list (i.e., determination step 710="No"), in step 712 the incoming message may be added to a "Deferred In-Box" memory storage with no display or sounding of an alert. The deferred inbox may thus queue received messages until the processor determines that the restricted condition has expired. In determination step 714, the processor may periodically check whether the restriction conditions no longer apply, such as the restricted time has expired or the phone has moved to an unrestricted location. In an embodiment, this is determined by the processor comparing the current time and location to the pre-established restriction criteria similar to determination steps 704 and 706. If the restriction conditions are no longer met (i.e., determination step 714="Yes"), in step 716 the parental control settings server may transfer the incoming message from the Deferred In-Box to the message system (e.g., SMS, MMS, email, etc.) inbox memory storage (step 708) and flush the "Deferred In-Box" by deleting the incoming message. In step 708, processor may add the extracted message to the In-Box and notify the user of the message's availability.

In the embodiment illustrated in FIG. 7, once all the restriction criteria are met, the contents of the deferred inbox may be released to the inbox of the mobile phone and the user may be alerted of the new message in the ordinary manner. This deferred delivery method 700 allows children to continue to receive text messages even when restricted but restricts the ability to view and respond to those messages to times and/or locations that the parent has specified in a parental control profile. The method also allows children to receive incoming messages from particular exempt individuals, such the parents, regardless of the time and location of the cell phone. In all cases, the messages are delivered to the phone and stored in the phone's memory, but access to the message is restricted (and notification is deferred) until the restriction conditions are removed (e.g., blackout period ends).

In various embodiments, the parental control settings specified for children's cell phones may be communicated to other communication sites. For example, the parental control settings server may be an open-access gateway to which third party applications (e.g., Facebook®) may be permitted to access and use the restriction parameters set by parents. In this manner, parental control profiles established by the parent may be enforced by any web site or application that is registered with the parental control settings server and/or has access to the open gateway.

Figure 8:
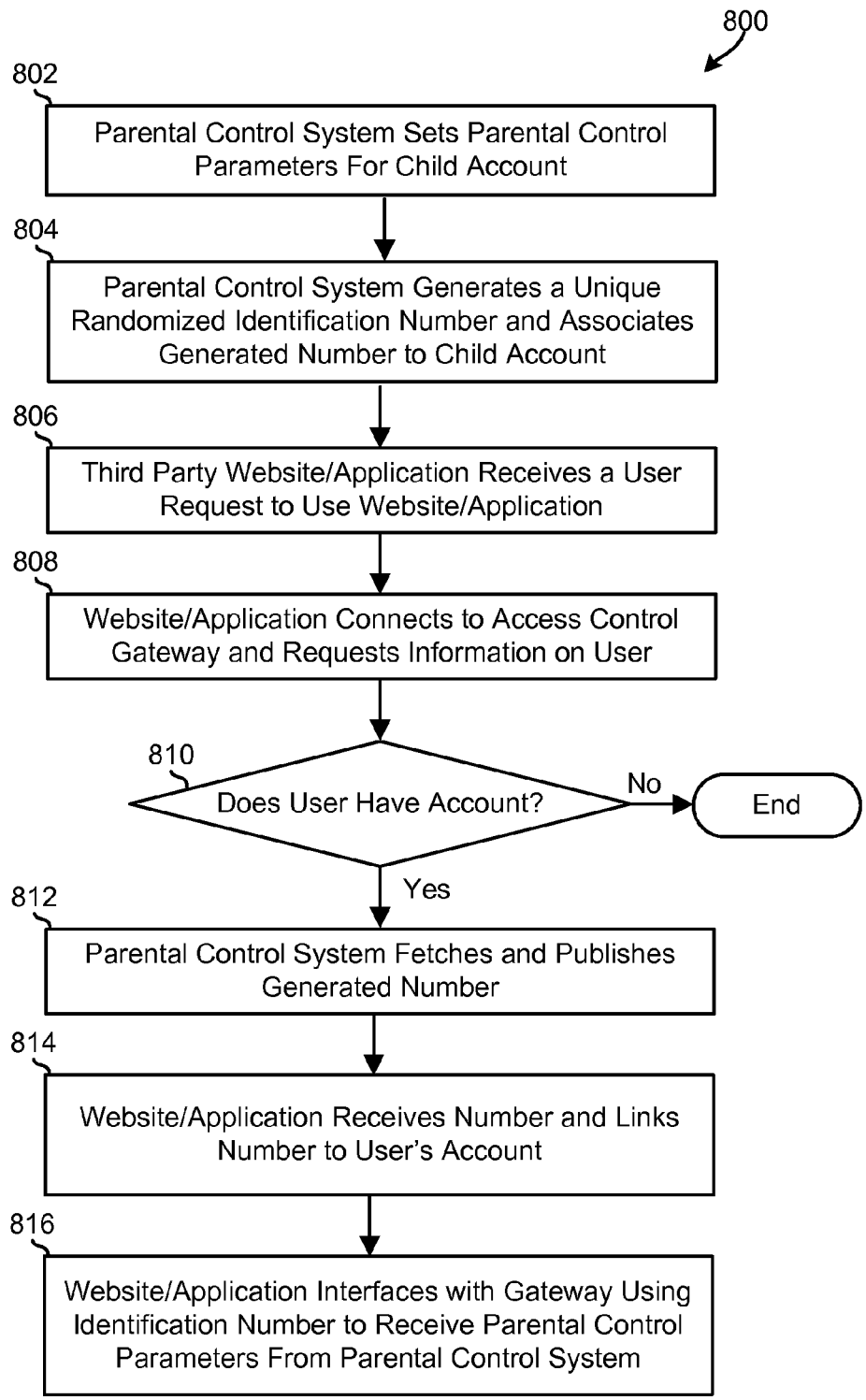
FIG. 8 is a process flow diagram of an embodiment method for applying the parental control settings to third party communication sites.

FIG. 8 illustrates an embodiment method 800 for applying the parental control settings to third party communication sites. In step 802, the parental control settings server may store parental control parameters for a child account based on the parent-user's selected configurations. In step 804, the parental control settings server may generate a unique randomized identification number for the child that is devoid of any personal information and associate the generated number with the child's parental control settings. In step 806, a third party website or application (e.g., Facebook®) may receive a request from a user to log onto the third's party application or website. In step 808, the third party website/application may interface with a parental control gateway of the parental control settings server and request parental control restrictions information on the user. For example, the third party website may send the parental control gateway the username or email address of the user attempting to log onto the system. In determination step 810, the parental control settings server may query its databases to determine if the information provided by the third party website/application matches any of the information maintained for any of the parental control settings server users. If there is a match (i.e., determination step 810="Yes"), in step 812 the parental control settings server may publish a generated identification number associated with the identified parental control settings server user to the gateway, which relays the information to the third party website/application. In step 814, the website/application may receive the identification number and link the number to the user's account. In step 816, the website/application may interface with the gateway to receive parental control parameters using only the identification number. In this manner, none of the child's identification information is made available to the third party website and the parental controls established for the child's phone may be enforced by any application/website, regardless of whether or not the child uses a controlled phone to access the site/application.

In various embodiments, the parental control profiles may permit or require intermediate authorization by a parent for certain actions (e.g., adding a new friend on Facebook®). When a child attempts certain specified activities on the mobile phone (e.g., purchasing applications, in-game purchases, adding a new friend, etc.), the restriction parameters may require the child's mobile phone (or the server) to contact the parent with an authorization request. The request may be via a short message service (SMS) text, email message, or any messaging service available to the parent's own mobile phone to which the parent may respond by either authorizing or disallowing the requested activity.

Figure 9:
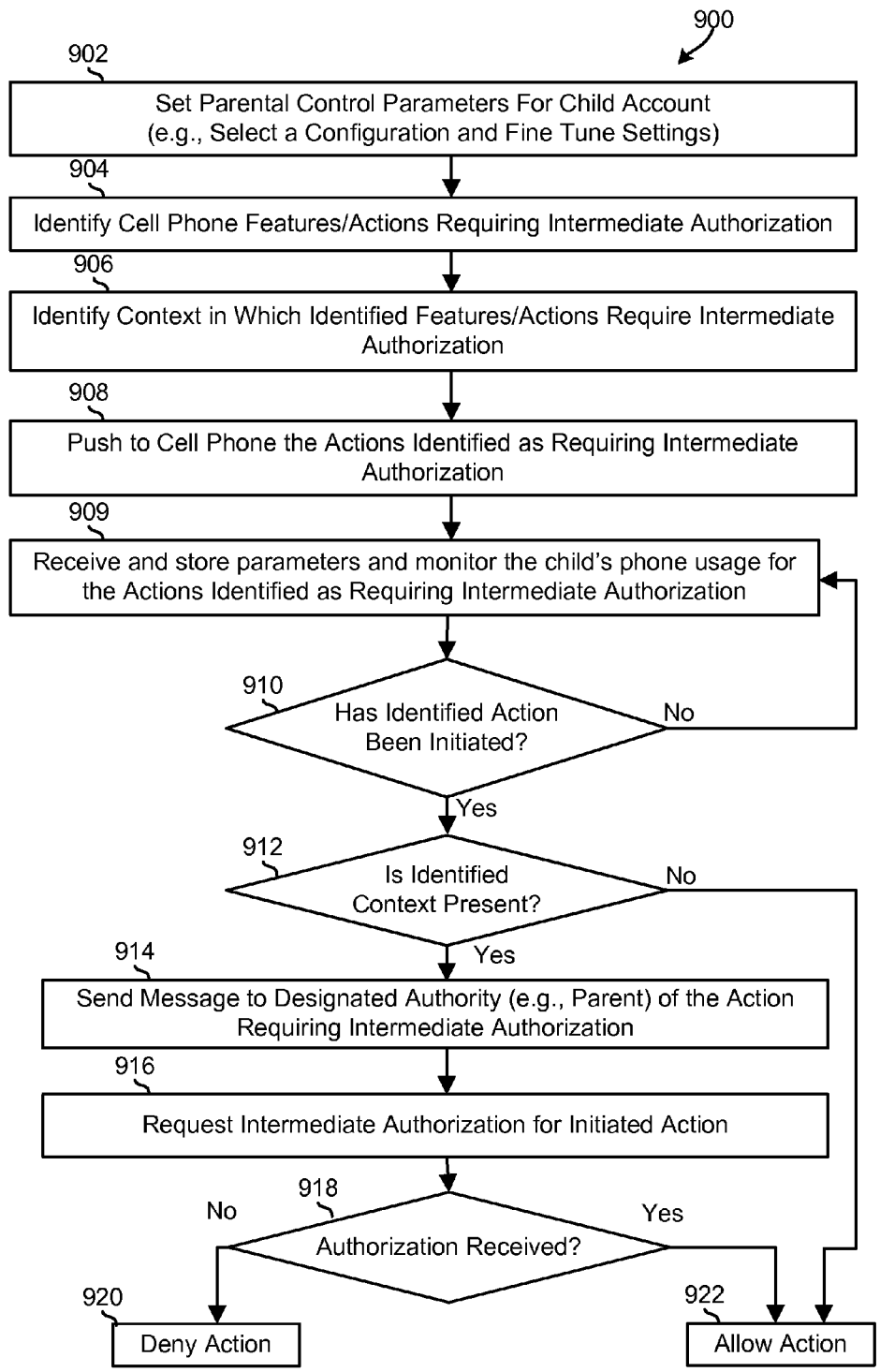
FIG. 9 is a process flow diagram of an embodiment method for implementing parental controls so that certain actions are only allowed upon intermediate authorization.

FIG. 9 illustrates an embodiment method 900 for implementing parental controls that require certain actions to be allowed on a controlled phone only upon intermediate authorization. In step 902, the parental control settings server may set parental controls for a user account by using one or more of the methods described above. In step 904, the parent may identify to the system the child cell phone features and/or child-user actions that are to be enabled/allow only upon the parent's specific authorization. For example, in step 904, the parental control settings server may prompt the parent to select one or more parental control parameters that identify certain features/actions (or categories of features/actions) that are to be allowed only upon parent's authorization of each use/action. In an embodiment, the control access system may also prompt the parent-user to select authorized users that may authorize such actions. In step 906, the parental control settings server may prompt the parent-user to identify the context (e.g., time, location, etc.) in which such actions/uses require parental authorization, receive the parent's input and store the received context in a memory. In step 908, the parental control settings server may push the requirements to the child's cell phone. The cell phone processor may receive and store those settings, and then monitor the child's phone usage for identified use/actions requiring intermediate authorization in step 909. In determination step 910, the cell phone processor may determine if any of the identified actions/uses is being initiated on the child's phone. If any of the identified actions/uses is being initiated (i.e., determination step 910="Yes"), in determination step 912, the cell phone processor may determine if any of the identified context-conditions for that action/use is present. If the context-conditions are not present (i.e., determination step 910="No") the action/use may be allowed in step 922.

If one or more of the context-conditions are present (i.e., determination step 910="Yes"), in step 914 the processor may send a message (e.g., SMS, email, etc.) notifying the parent or designated authority of the initiation of actions/uses requiring intermediate authorization. For example, the processor may send the designated authority a SMS text message informing the authority of the action (e.g., "George has requested to add Nick as a facebook friend"). As another example, the processor may send a message to the parental control settings server indicating that it should send such a message to informing the authority of the action. In the message sent step 916, the processor (or the parental control settings server) may request authorization for the use/action. The authority may respond to such a message with an approval or disapproval reply message that is delivered. For example, the message to the designated authority may request a reply authorization SMS or email message (e.g., "Do you wish to allow Nick to be added as a facebook friend?"). In determination step 918, the processor may wait for the authority to respond to the messages to determine if the use/action is authorized. If the processor receives a message indicating that the authority denies the action/use (e.g., the authority responds "No") or if no response is received within a predetermined amount of time (i.e., determination step 918="No"), the processor denies the action/use in step 920. If the processor receives a reply message indicating that the authority authorizes the action/use within the allocated time (i.e., determination step 918="Yes"), the processor may allow the action/user in step 922.

In various embodiments, the cell phone processor may be configured to limit voice calls under some parental control configurations by blocking incoming/outbound calls to everyone except to and from specifically identified individuals/entities and/or by blocking calls during specific date/time periods except to/from the specifically identified individuals/entities (parent, police, etc.).

In various embodiments, the parental control profiles may be configured to limit outgoing text messages by: blocking the sending of SMS texts to unknown/unapproved numbers; blocking the sending of SMS texts during date/time periods except to specifically identified individuals/entities; auto-forwarding outgoing messages to parent/authorized user; and/or requiring parental authorization to send messages to new recipients.

In various embodiments, the parental control profiles may be configured to limit data calls by blocking data call activity during specified date/time periods.

In an embodiment, the parental control profiles may be configured to include any combination of the above-mentioned limitations, restrictions and/or access features.

In various embodiments, the cell phone process implementing parental controls may limit content available on a controlled phone by: requiring parental authentication to grant access to web sites; enforce web site ratings; filtering content based on ratings (MPAA, etc.); and/or filtering advertisements based on categorization and rating.

In various embodiments, the cell phone process implementing parental controls may control a cell phone camera by: restricting access to a cell phone camera and/or each individual camera feature (e.g., sending, receiving, storing, etc.); restricting the locations in memory where pictures may stored; restricting access during date/time periods; and/or restricting the camera in certain locations.

In various embodiments, the cell phone process implementing parental controls may restrict access to BlueTooth, WLANs, connected devices and/or supported profiles.

In various embodiments, the cell phone process implementing parental controls may restrict data connections (e.g., TCP/IP), restrict connections to specific sites, restrict connection types (e.g., HTTP, HTTPS, email, etc.) and/or restrict connections by date/time periods.

In various embodiments, the cell phone process implementing parental controls may restrict access to a media player during designated time periods and/or in identified locations.

In various embodiments, the cell phone process implementing parental controls may restrict access to voice over internet protocol (VOIP) or other interact voice communication technologies (e.g., QChat).

In various embodiments, the cell phone process implementing parental controls may: disable multimedia messaging service (MMS) and/or email functionality; limit outgoing emails/MMS; block the sending of emails/MMS to unknown/unapproved numbers; block the sending of emails/MMS during certain date/time periods except to those specifically permitted; auto-forward outgoing emails/MMS to parent/authorized user; and/or require parental authorization to send emails/MMS to new recipients.

In various embodiments, the cell phone process implementing parental controls may impose restrictions on sending/receiving pictures and from/to identified individuals and/or may restrict sending/receiving pictures to everyone except identified individuals.

In various embodiments, the cell phone process implementing parental controls may require the receipt of parental authentication before sending messages to a new MMS recipient.

In various embodiments, the cell phone process implementing parental controls may auto-forward incoming/outgoing MMS messages to parents.

In various embodiments, the cell phone process implementing parental controls may limit application (games, etc.) usage by restricting application use to designated time periods.

In various embodiments, the cell phone process implementing parental controls may limit application downloads by enforcing ratings, limiting downloads to certain dates/time periods and/or requiring parental authentication prior to downloading the applications.

In various embodiments, the cell phone process implementing parental controls may control a cell phone's global positioning satellite (GPS) features by disabling the GPS, limiting application that use the GPS and/or restricting the times/locations in which the GPS feature may be used.

In an embodiment, the cell phone process implementing parental controls may implement any combination of the above-mentioned limitations, restrictions and/or access features.

It should be noted that the above-mentioned limitations, restrictions and/or access features are provided only as examples, and the claims should not be limited to the above mentioned limitations, restrictions and/or access features unless they are expressly recited in the claims.

As mentioned above, in an embodiment, the parental control server may be further configured to transmit or otherwise implement the parental control settings established for cell phones and mobile computing devices on any other network-accessible media access or computing device designated by parents. In this manner, parents can use the parental control server user interface (or web portal) as a single site for implementing comprehensive parental controls that are implemented consistently among all devices identified by the parent. Examples of other types of media-access and computing devices which may receive such parental control settings from the parental control server include, without limitation, televisions, personal computers, gaming systems, audio and video player systems, and similar devices that will be developed in the future.

In this embodiment, the parent may identify the other devices that should implement the parental control settings as part of setting up the user account and identifying each child's cell phone. This additional information may be provided as part of the operations performed in any of steps 206, 504, 602, 622 and/or 902 described above. This may involve the parent identifying the URL, network address or network controller that the parental control server can use or contact to push out parental control settings. So configured, the parental control server may also send the appropriate parental control settings or feature restrictions to the other identified devices as part of the operations performed in any of steps 218, 612, 656, 660 and/or 908 described above. For devices which include processors configured to implement parental controls, such operations may involve transmitting the corresponding settings data using a suitable messaging protocol over whatever network by which the server can access the device. For devices which are not equipped with processors configured to implement parental controls, such operations may involve communicating with other devices (e.g., a local network router or set top box) or network controllers (e.g., a cable or satellite network operator) which can implement at least some or similar restrictions.

Figure 10:
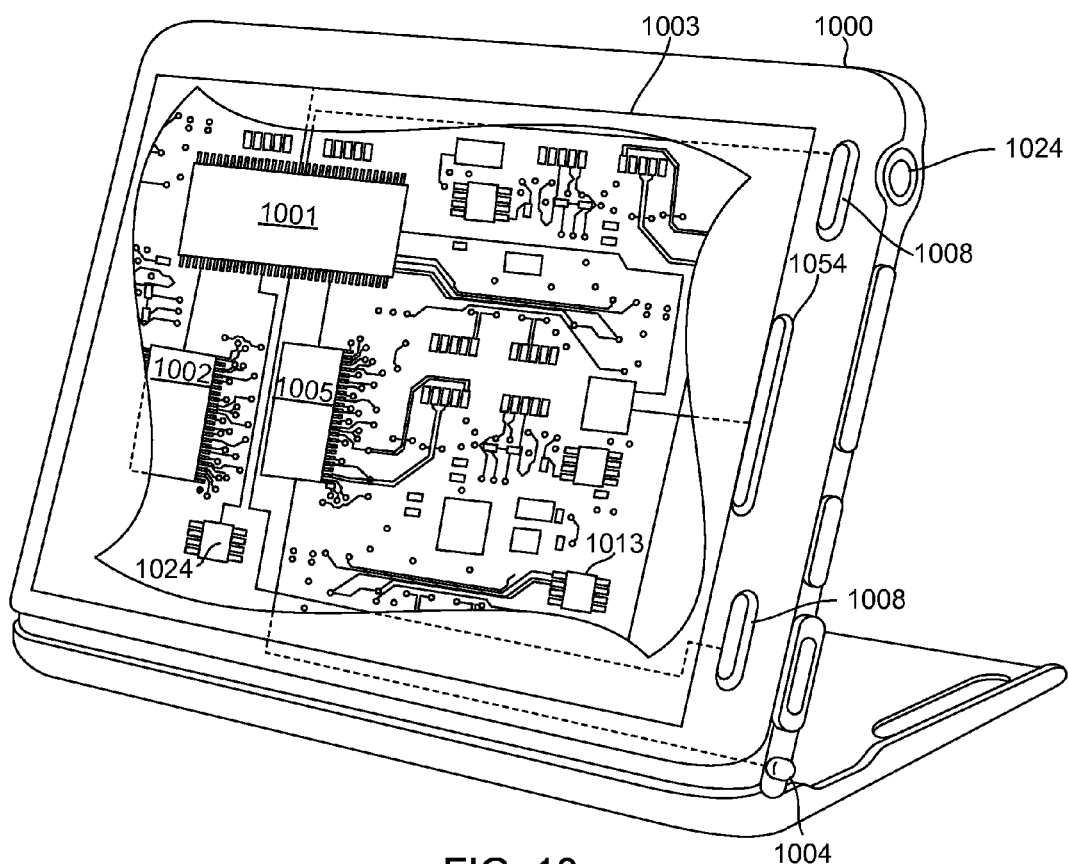
FIG. 10 is a component block diagram of a receiver device suitable for use in an embodiment.

FIG. 10 is a system block diagram of a cell-phone suitable for use with any of the embodiments. A cell phone 1000 may include a processor 1001 coupled to internal memory 1002, a display 1003, and to a speaker 1054. Additionally, the cell phone 1000 may include an antenna 1004 for sending and receiving electromagnetic radiation that may be connected to a wireless data link and/or cell telephone transceiver 1005 coupled to the processor 1001. Cell phones 1000 typically also include menu selection buttons or rocker switches 1008 for receiving user inputs.

Figure 11:
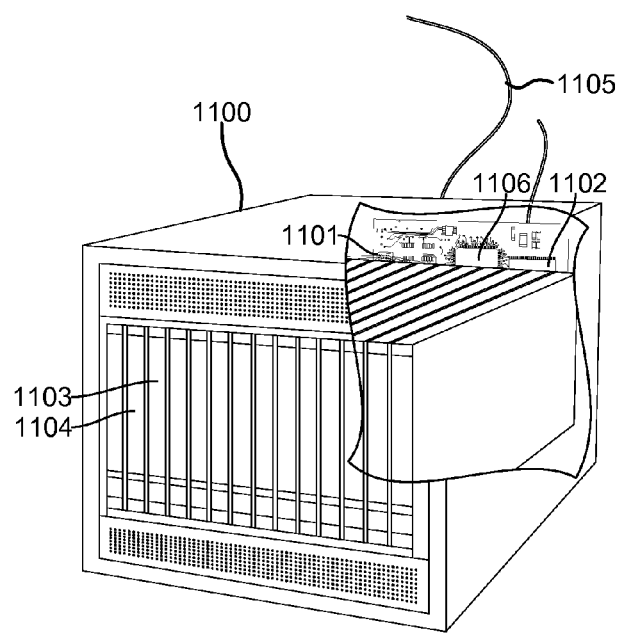
FIG. 11 is a component block diagram of a server device suitable for use in an embodiment.

The various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 coupled to the processor 1101 for establishing data connections with a network 1105, such as a local area network coupled to other broadcast system computers and servers.

The processors 1001, 1101 may be any programmable microprocessor, microcomputer or multiple processor chip or chips that can be configured by software instructions (applications) to perform a variety of functions, including the functions of the various embodiments described below. In some mobile receiver devices, multiple processors 1101 may be provided, such as one processor dedicated to wireless communication functions and one processor dedicated to running other applications. Typically, software applications may be stored in the internal memory 1002, 1102, 1103 before they are accessed and loaded into the processor 1001, 1101. The processor 1001, 1101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for restricting delivery of incoming messages at a mobile device, comprising:
    receiving an incoming message on the mobile device;
    determining whether one or more restriction conditions match at least one restriction criteria specified in a community-based parental control profile based on demographic information;
    storing the received message in memory and not passing it to a message application inbox when it is determined that at least one restriction condition matches at least one restriction criteria;
    modifying the at least one restriction criteria of the community-based parental control profile with at least one of a third party parental control profile and a non-community based parental control profile;
    checking the restriction conditions to determine whether the at least one restriction condition still matches the modified at least one restriction criteria; and
    passing stored received messages to the message application inbox when the restriction conditions no longer match any of the restriction criteria.

2. The method of claim 1, further comprising:
    passing the received incoming message to an inbox of the mobile device when the restriction criteria of the community-based parental control profile is no longer satisfied.

3. The method of claim 1, further comprising determining whether a sender of the received message is an exempted sender specified in the community-based parental control profile, wherein storing the received message in memory and not passing it to a message application inbox comprises storing the received message in memory and not passing it to a message application inbox when it is determined that both the sender of the message is not an exempted sender and that at least one restriction condition matches at least one restriction criteria.

4. The method of claim 1, wherein the at least one restriction condition includes a time period.

5. The method of claim 1, wherein the at least one restriction condition includes a current location of the mobile device.

6. The method of claim 1, wherein the restriction conditions include both a time and a current location of the mobile device.

7. The method of claim 1, wherein the restriction conditions are set on an external server using a remote computer, the method further comprising:

sending the restriction conditions to the mobile device through a wireless communication network; and storing the restriction conditions in a deeply embedded parental control module implemented in an operating system of the mobile device.

8. The method of claim 1, wherein the mobile device is a mobile phone.

9. The method of claim 7, wherein the wireless communication network is a cellular telephone network.

10. A system for restricting delivery of incoming messages to a mobile device, comprising:

a parental control server;

a wireless communication network; and a mobile device interconnected to the parental control server through the cellular telephone network, wherein the parental control server is configured to send at least one restriction criteria to the mobile device; and wherein the mobile device comprises:

a display;

an internal memory; and a processor coupled to the display and the internal memory, wherein the processor is configured with processor-executable instructions to perform operations comprising:

receiving an incoming message on the mobile device;

determining whether one or more restriction conditions match at least one restriction criteria specified in a community-based parental control profile based on demographic information;

storing the received message in memory and not passing it to a message application inbox when it is determined that at least one restriction condition matches at least one restriction criteria;

modifying the at least one restriction criteria of the community-based parental control profile with at least one of a third party parental control profile and a non-community based parental control profile;

checking the restriction conditions to determine whether the at least one restriction condition still matches the modified at least one restriction criteria; and passing stored received messages to the message application inbox when the restriction conditions no longer match any of the restriction criteria.

11. The system of claim 10, wherein the mobile device is a mobile phone.

12. The system of claim 10, wherein the wireless communication network is a cellular telephone network.

13. A system for restricting delivery of incoming messages to a mobile device, comprising:

means for sending restriction conditions to mobile devices; and a mobile device comprising:

means for receiving an incoming message on a mobile device;

means for determining whether one or more restriction conditions match at least one restriction criteria specified in a community-based parental control profile based on demographic information;

means for storing the received message in memory and not passing it to a message application inbox when it is determined that the at least one restriction condition matches the at least one restriction criteria;

means for modifying the at least one restriction criteria of the community-based parental control profile with at least one of a third party parental control profile and a non-community based parental control profile;

means for checking the restriction conditions to determine whether the at least one restriction condition still matches the modified at least one restriction criteria; and means for passing stored received messages to the message application inbox when the restriction conditions no longer match any of the restriction criteria.

14. The system of claim 13, wherein the mobile device is a mobile phone.

15. A mobile device, comprising:

a wireless communication transceiver;

a display;

an internal memory; and a processor coupled to the wireless communication transceiver; the display and the internal memory, wherein the processor is configured with processor-executable instructions to perform operations comprising:

receiving a community-based parental control profile based on demographic information comprising at least one restriction criteria;

storing the received community-based parental control profile in the internal memory;

receiving an incoming message via the wireless communication transceiver;

determining whether one or more restriction conditions match the at least one restriction criteria of the community-based parental control profile stored in the internal memory;

storing the received message in the internal memory and not passing it to a message application inbox when it is determined that the at least one restriction condition matches the at least one restriction criteria;

modifying the at least one restriction criteria of the community-based parental control profile stored in the internal memory with at least one of a third party parental control profile and a non-community based parental control profile;

checking the restriction conditions to determine whether the at least one restriction condition still matches the modified at least one restriction criteria in the internal memory; and passing stored received messages to the message application inbox when the restriction conditions no longer match any of the restriction criteria stored in the internal memory.

16. The mobile device of claim 15, wherein the processor is configured with processor-executable instructions to perform operations further comprising:

passing the received incoming message to an inbox of the mobile device when the restriction criteria of the community-based parental control profile is no longer satisfied.

17. The mobile device of claim 15, wherein the processor is configured with processor-executable instructions to perform operations further comprising:

determining whether a sender of the received message is an exempted sender specified in the community-based parental control profile, wherein storing the received message in the internal memory and not passing it to a message application inbox comprises storing the received message in the internal memory and not passing it to a message application inbox when it is determined that both the sender of the message is not an exempted sender and that at least one restriction condition matches at least one restriction criteria.

18. The mobile device of claim 15, wherein the at least one restriction condition includes a time period.

19. The mobile device of claim 15, wherein the at least one restriction condition includes a current location of the mobile device.

20. The mobile device of claim 15, wherein the restriction conditions include both a time and a current location of the mobile device.

21. The mobile device of claim 15, wherein the processor is configured with processor-executable instructions to perform operations further comprising:
storing the restriction conditions in a deeply embedded parental control module implemented in an operating system of the mobile device.

22. The mobile device of claim 15, wherein the mobile device is a mobile phone.

23. The mobile device of claim 15, wherein the wireless communication transceiver is a cellular telephone network transceiver.

24. A non-transitory processor-readable storage medium having stored thereon processor executable instructions configured to cause a processor of a mobile device to perform operations comprising:
receiving a community-based parental control profile based on demographic information comprising at least one restriction criteria;
storing the received community-based parental control profile in an internal memory;
receiving an incoming message on the mobile device via a wireless communication network;
determining whether one or more restriction conditions match the at least one restriction criteria specified in the community-based parental control profile stored in the internal memory;
storing the received message in the internal memory and not passing it to a message application inbox when it is determined that at least one restriction condition matches the at least one restriction criteria;
modifying the at least one restriction criteria of the community-based parental control profile stored in the internal memory with at least one of a third party parental control profile and a non-community based parental control profile;
checking the restriction conditions to determine whether the at least one restriction condition still matches the modified at least one restriction criteria stored in the internal memory; and
passing stored received messages to the message application inbox when the restriction conditions no longer match any of the restriction criteria in the internal memory.

25. The non-transitory processor-readable storage medium of claim 24, wherein the stored processor executable instructions are configured to cause a processor of a mobile device to perform operations further comprising:
passing the received incoming message to an inbox of the mobile device when the restriction criteria of the community-based parental control profile is no longer satisfied.

26. The non-transitory processor-readable storage medium of claim 24, wherein the stored processor executable instructions are configured to cause a processor of a mobile device to perform operations further comprising:
determining whether a sender of the received message is an exempted sender specified in the community-based parental control profile, wherein storing the received message in the internal memory and not passing it to a message application inbox comprises storing the received message in the internal memory and not passing it to a message application inbox when it is determined that both the sender of the message is not an exempted sender and that at least one restriction condition matches at least one restriction criteria.

27. The non-transitory processor-readable storage medium of claim 24, wherein the stored processor executable instructions are configured to cause a processor of a mobile device to perform operations such that the at least one restriction condition includes a time period.

28. The non-transitory processor-readable storage medium of claim 24, wherein the stored processor executable instructions are configured to cause a processor of a mobile device to perform operations such that the at least one restriction condition includes a current location of the mobile device.

29. The non-transitory processor-readable storage medium of claim 24, wherein the stored processor executable instructions are configured to cause a processor of a mobile device to perform operations such that the restriction conditions include both a time and a current location of the mobile device.

30. The non-transitory processor-readable storage medium of claim 24, wherein the stored processor executable instructions are configured to cause a processor of a mobile device to perform operations further comprising:
storing the restriction conditions in a deeply embedded parental control module implemented in an operating system of the mobile device.

31. The non-transitory processor-readable storage medium of claim 24, wherein the stored processor executable instructions are configured to be executed by a processor of a mobile phone.

32. The non-transitory processor-readable storage medium of claim 24, wherein the stored processor executable instructions are configured to cause a processor of a mobile device to perform operations such that receiving an incoming message on the mobile device via a wireless communication network comprises receiving an incoming message on the mobile device via a cellular telephone network.

* * * * *